United States Patent
Lai et al.

(10) Patent No.: US 10,861,108 B2
(45) Date of Patent: *Dec. 8, 2020

(54) RESOURCE SHARING METHOD AND TERMINAL

(71) Applicant: Tencent Technology (Shenzhen) Company Limited, Shenzhen (CN)

(72) Inventors: Wenhui Lai, Shenzhen (CN); Danni Lin, Shenzhen (CN); Pengfei Zhong, Shenzhen (CN); Feng Xiong, Shenzhen (CN); Lin Liu, Shenzhen (CN); Wei Zhai, Shenzhen (CN); Richeng Xiao, Shenzhen (CN); Lingfeng Xu, Shenzhen (CN); Zengkang Liao, Shenzhen (CN); Cong Tang, Shenzhen (CN); Ming Huang, Shenzhen (CN); Moubang Li, Shenzhen (CN); Jianwei Kuang, Shenzhen (CN); Junchao Wang, Shenzhen (CN); Song Wang, Shenzhen (CN); Zurong Wu, Shenzhen (CN); Qiang Tu, Shenzhen (CN); Shan Chen, Shenzhen (CN); Jianli Li, Shenzhen (CN); Chang He, Shenzhen (CN); Wei Shi, Shenzhen (CN); Yanxue Chong, Shenzhen (CN); Yehui Huang, Shenzhen (CN); Qianqian Lin, Shenzhen (CN); Yi Chen, Shenzhen (CN); Yumiao Zhang, Shenzhen (CN); Yifan Yang, Shenzhen (CN); Chuanqing Li, Shenzhen (CN); Zhenquan Wu, Shenzhen (CN); Xingxing Dai, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 214 days.

This patent is subject to a terminal disclaimer.

(21) Appl. No.: 16/045,467

(22) Filed: Jul. 25, 2018

(65) Prior Publication Data

US 2018/0330452 A1 Nov. 15, 2018

Related U.S. Application Data

(63) Continuation of application No. 16/041,581, filed on Jul. 20, 2018, which is a continuation-in-part of
(Continued)

(30) Foreign Application Priority Data

| Jan. 21, 2016 | (CN) | .......................... 2016 1 0042104 |
| Jan. 21, 2016 | (CN) | .......................... 2016 1 0042161 |
| Jan. 28, 2016 | (CN) | .......................... 2016 1 0059620 |

(51) Int. Cl.
*G06Q 50/00* (2012.01)
*H04L 12/58* (2006.01)
(Continued)

(52) U.S. Cl.
CPC ......... *G06Q 50/01* (2013.01); *G06Q 30/0207* (2013.01); *H04L 51/04* (2013.01);
(Continued)

(58) Field of Classification Search
None
See application file for complete search history.

(56) References Cited

U.S. PATENT DOCUMENTS

| 10,192,274 B2 * | 1/2019 | Wu .................... G06Q 30/0621 |
| 2009/0094134 A1 * | 4/2009 | Toomer ................. G06Q 20/36 |
| | | 705/26.1 |

(Continued)

FOREIGN PATENT DOCUMENTS

| CN | 102724639 A | 10/2012 |
| CN | 103716339 A | 4/2014 |

(Continued)

Primary Examiner — Dhairya A Patel
(74) Attorney, Agent, or Firm — Morgan, Lewis & Bockius LLP

(57) ABSTRACT

A resource sharing method is performed at a mobile terminal, the method including: configuring a to-be-shared resource by using a processor, to obtain data needed for obtaining a resource; obtaining a user identifier of a currently logged-in social networking application; obtaining a resource sharing message image template, a user-defined visible element, and configuration information of the visible element that are associated with the user identifier; drawing a resource sharing message image according to the resource sharing message image template, the visible element, and the configuration information, and displaying the resource sharing message image on a social network propagation page of the social networking application; and transferring, by using a social network, a resource sharing message corresponding to the resource sharing message image, the resource sharing message including the data needed for obtaining a resource.

17 Claims, 36 Drawing Sheets

Related U.S. Application Data application No. PCT/CN2017/070630, filed on Jan. 9, 2017, and a continuation-in-part of application No. PCT/CN2017/071595, filed on Jan. 18, 2017, and a continuation-in-part of application No. PCT/CN2017/071557, filed on Jan. 18, 2017.

(51) Int. Cl.
| | | |
|---|---|---|
| *H04W 4/21* | (2018.01) | |
| *G06Q 30/02* | (2012.01) | |
| *H04W 4/12* | (2009.01) | |
| *H04W 8/20* | (2009.01) | |
| *H04W 4/06* | (2009.01) | |
| *H04W 4/08* | (2009.01) | |

(52) U.S. Cl.
CPC ............ *H04L 51/10* (2013.01); *H04L 51/32* (2013.01); *H04L 51/38* (2013.01); *H04W 4/12* (2013.01); *H04W 4/21* (2018.02); *H04W 8/20* (2013.01); *H04W 4/06* (2013.01); *H04W 4/08* (2013.01)

(56) References Cited

U.S. PATENT DOCUMENTS

| | | | | |
|---|---|---|---|---|
| 2010/0023341 | A1* | 1/2010 | Ledbetter | G06Q 10/10 705/1.1 |
| 2010/0114579 | A1* | 5/2010 | Ostermann | G10L 13/08 704/260 |
| 2010/0138341 | A1* | 6/2010 | Solomon | G06Q 20/32 705/42 |
| 2011/0078270 | A1 | 3/2011 | Galli et al. | |
| 2012/0084666 | A1* | 4/2012 | Hickman | H04L 67/02 715/751 |
| 2013/0042169 | A1* | 2/2013 | Reedy | H04L 67/02 715/202 |
| 2013/0262992 | A1* | 10/2013 | He | G06Q 50/18 715/255 |
| 2013/0268391 | A1* | 10/2013 | Esch | G06Q 30/02 705/26.7 |
| 2013/0332307 | A1* | 12/2013 | Linden | G06Q 30/0631 705/26.7 |
| 2014/0351015 | A1* | 11/2014 | Ehn | G06Q 50/01 705/7.31 |
| 2015/0089660 | A1* | 3/2015 | Song | G06F 3/04842 726/26 |
| 2017/0178094 | A1* | 6/2017 | Yu | G06Q 20/386 |
| 2018/0102993 | A1* | 4/2018 | Ji | H04L 67/2823 |

FOREIGN PATENT DOCUMENTS

| | | |
|---|---|---|
| CN | 103973769 A | 8/2014 |
| CN | 104484694 A | 4/2015 |
| CN | 104615335 A | 5/2015 |
| CN | 104615747 A | 5/2015 |
| CN | 104618226 A | 5/2015 |
| CN | 104618345 A | 5/2015 |
| CN | 105591885 A | 5/2015 |
| CN | 105096137 A | 11/2015 |
| CN | 105096157 A | 11/2015 |
| CN | 105187527 A | 12/2015 |
| CN | 105554027 A | 5/2016 |
| CN | 105741091 A | 7/2016 |
| CN | 105938604 A | 9/2016 |
| WO | WO 2015143068 A1 | 9/2015 |

OTHER PUBLICATIONS

Tencent Technology, ISRWO, PCT/CN2017/070630, Mar. 30, 2017, 10 pgs.
Tencent Technology, IPRP, PCT/CN2017/070630, Jul. 24, 2018, 8 pgs.
Tencent Technology, ISRWO, PCT/CN201071557, Apr. 26, 2017, 8 pgs.
Tencent Technology, IPRP, PCT/CN201071557, Jul. 31, 2018, 7 pgs.
Tencent Technology, ISRWO, PCT/CN201071595, Mar. 29, 2017, 8 pgs.
Tencent Technology, IPRP, PCT/CN201071595, Jul. 24, 2018, 7 pgs.

* cited by examiner

RESOURCE SHARING METHOD AND TERMINAL

CROSS-REFERENCE TO RELATED APPLICATIONS

This application is a continuation of U.S. patent application Ser. No. 16/041,581, entitled "RESOURCE SHARING METHOD AND TERMINAL" filed on Jul. 20, 2018, which is a continuation-in-part application of (i) PCT/CN2017/070630, entitled "RESOURCE SHARING METHOD AND TERMINAL" filed on Jan. 9, 2017, which claims priority to Chinese Patent Application No. 201610042104.8, filed with the State Intellectual Property Office of the People's Republic of China on Jan. 21, 2016, and entitled "RESOURCE SHARING METHOD AND TERMINAL", (ii) PCT/CN2017/071595, entitled "RESOURCE SHARING METHOD, TERMINAL, AND STORAGE MEDIUM" filed on Jan. 18, 2017, which claims priority to Chinese Patent Application No. 201610042161.6, filed with the State Intellectual Property Office of the People's Republic of China on Jan. 21, 2016, and entitled "RESOURCE SHARING METHOD, TERMINAL, AND STORAGE MEDIUM", and (iii) PCT/CN2017/071557, entitled "RESOURCE SHARING METHOD, RESOURCE OBTAINING METHOD, TERMINAL, AND SERVER" filed on Jan. 18, 2017, which claims priority to Chinese Patent Application No. 201610059620.1, filed with the State Intellectual Property Office of the People's Republic of China on Jan. 28, 2016, and entitled "RESOURCE SHARING METHOD, RESOURCE OBTAINING METHOD, TERMINAL, AND SERVER", all of which are incorporated herein by reference in their entirety.

FIELD OF THE TECHNOLOGY

The present disclosure relates to the field of network technologies, and in particular, to a resource sharing method and a terminal.

BACKGROUND OF THE DISCLOSURE

With the development of network technologies, more users are engaged in social networking activities by using a network. The users usually share resources by using an instant messaging application or a social networking application, especially for publishing a resource message by using an instant messaging application or a social networking application to implement sharing of resources. The resources include but are not limited to virtual red packets, electronic coupons, point coupons, points, electronic vouchers, game currency, and virtual objects. After the resources are shared on the instant messaging application or the social networking application, users of the instant messaging application or the social networking application may request to share the resources.

During conventional resource sharing, the resource message body sent by the resource sharing initiator can carry only word information, and types of information carried during resource sharing are extremely limited.

SUMMARY

According to various embodiments of this application, a resource sharing method and a terminal are provided.

According to a first aspect of the present disclosure, a resource sharing method performed at a mobile terminal having one or more processors and memory storing a plurality of programs to be executed by the one or more processors, the method comprising, comprising:

obtaining configured user identifier;

obtaining multimedia data;

obtaining a resource sharing request, and associating the user identifier with the multimedia data according to the resource sharing request;

generating a resource sharing instruction according to an association relationship between the user identifier and the multimedia data; and executing the resource sharing instruction.

According to a second aspect of the present disclosure, a mobile terminal for media information releasing includes one or more processors, memory coupled to the one or more processors, and a plurality of programs stored in the memory that, when executed by the one or more processors, cause the mobile terminal to perform the aforementioned resource sharing method.

According to a third aspect of the present disclosure, a non-transitory computer readable storage medium stores a plurality of programs that, when executed by one or more processors of a mobile terminal, cause the mobile terminal to perform the aforementioned resource sharing method.

Details of one or more embodiments of the present disclosure are provided in the following accompanying drawings and descriptions. Other features, objectives, and advantages of the present disclosure are obvious in this specification, the accompanying drawings, and the claims.

BRIEF DESCRIPTION OF THE DRAWINGS

To describe the technical solutions in the embodiments of the present disclosure or in the existing technologies more clearly, the following briefly describes the accompanying drawings required for describing the embodiments or the existing technologies. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure.

It may be understood that terms "first", "second" and the like used in the present disclosure may be used to describe various elements in this specification, but the elements are not limited by the terms. The terms are merely used to distinguish a first element from another element. For example, in a case not departing from the scope of the present disclosure, a first client may be referred to as a second client, and similarly, a second client may be referred to as a first client. Both the first client and the second client are clients, but are not a same client.

Figure 1:
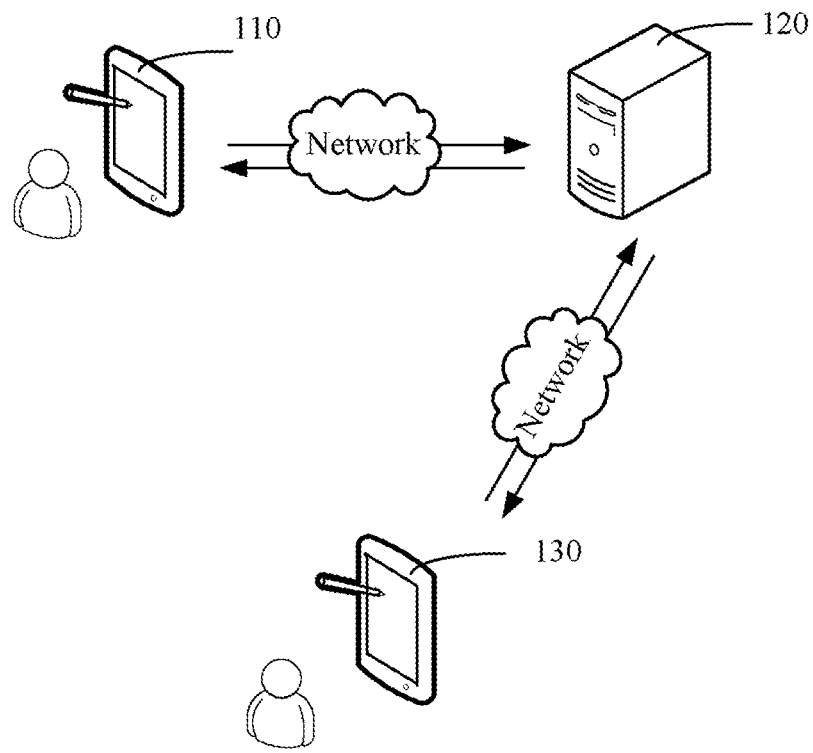
FIG. 1 is a schematic diagram of an application environment of a resource sharing method according to some embodiments of the present disclosure.

FIG. 1 is a schematic diagram of an application environment of a resource sharing method according to an embodiment. As shown in FIG. 1, the application environment includes a first terminal 110, a server 120, and a second terminal 130. The first terminal 110 and the second terminal 130 communicate with the server 120 by using a network. The first user logs in to an application program client on the first terminal 110 to initiate a resource sharing request, obtains, according to the resource sharing request, user identifier and multimedia data that is recorded or selected by a user, generates a resource message including the user identifier and the multimedia data, sends, by using the server 120, the resource message to a friend of the first user, that is, a second user on the second terminal 130 or to a group that the first user is in, and displays the resource message in the group. After the second user on the second terminal 130 or a member in the group receives the resource message, the second user or the member triggers the resource message, plays the multimedia data in the resource message, and receives a resource in the resource message. The resource message is a message including the user identifier. The user identifier may include the resource and an identifier of a resource sharing initiator, and may further include information content shared by the resource sharing initiator, a time and a validity period of resource sharing, and the like. The multimedia data may be multimedia data that is recorded in real time or selected locally or from a network by the resource sharing initiator. The multimedia data may be one or two of audio data and video data.

In addition, the server 120 may generate the resource message including the user identifier and the multimedia data.

Figure 2:
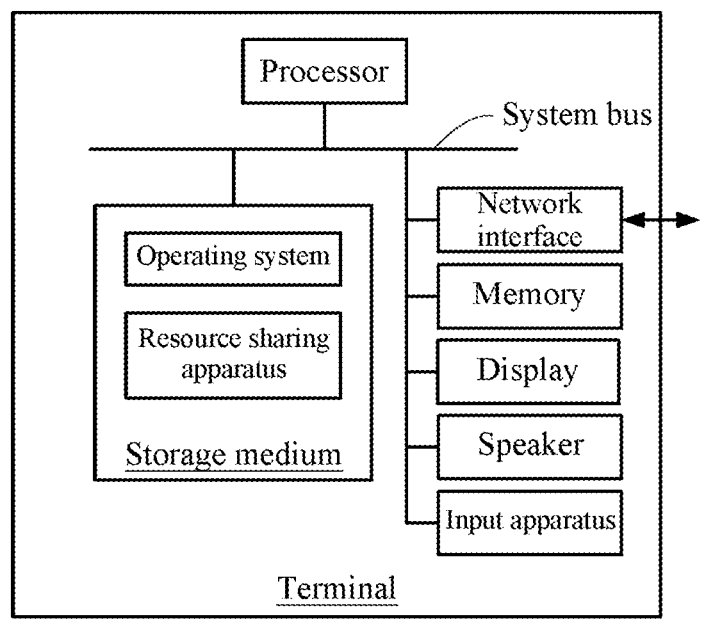
FIG. 2 is a schematic diagram of an internal structure of a terminal according to some embodiments of the present disclosure.

FIG. 2 is a schematic diagram of an internal structure of a terminal according to an embodiment. As shown in FIG. 2, the terminal includes a processor, a storage medium, a memory and a network interface that are connected by using a system bus, a voice acquisition apparatus, a display, a speaker, and an input apparatus. The storage medium of the terminal stores an operating system, and further includes a resource sharing apparatus. The resource sharing apparatus is configured to perform a resource sharing method. The processor is configured to provide computing and controlling capabilities, to support operating of the entire terminal. The memory in the terminal provides an environment for operating of the resource sharing apparatus in the storage medium. The network interface is configured to perform network communication with a server, such as send a resource sharing request to the server, and receive information that is returned by the server and that indicates that a resource receiver successfully receives the resource sharing request. The display of the terminal may be a liquid crystal display, an E-ink display, or the like. The input apparatus may be a touch layer covered on the display, or may be a button, a track ball, or a touch pad disposed on an external housing of the terminal, or may be an externally connected keyboard, a touch pad, a mouse or the like. The terminal may be a mobile phone, a tablet computer, a personal digital assistant, or a wearable device. A person skilled in the art may understand that FIG. 2 is merely one of structural block diagrams related to the solution of this application, and does not constitute a limit to the terminal to which the solution of this application is applied. Specifically, the terminal may include more or less components than those shown in the figure, or combine some components, or have different component deployments.

Figure 3:
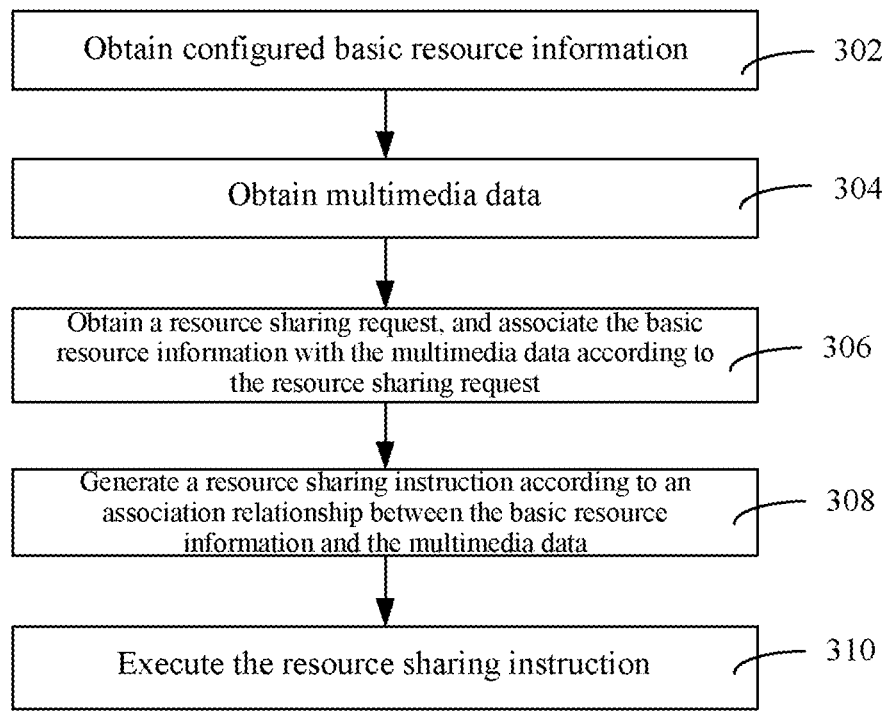
FIG. 3 is a flowchart of a resource sharing method according to some embodiments of the present disclosure.

FIG. 3 is a flowchart of a resource sharing method according to an embodiment. As shown in FIG. 3, a resource sharing method is described from the perspective of resource sharing initiation and run on a first terminal 110, and includes the following steps:

Step 302: Obtain configured user identifier.

Specifically, the user identifier may include a resource and an identifier of a user, and may further include information content shared by a resource sharing initiator, a time and validity period of resource sharing, and the like. The resource may be money, an electronic voucher, points, game currency, a physical object coin certificate, and the like. The identifier of the user is an identifier that uniquely identifies a user identity, and may be an instant messaging account, a mobile phone number, a social networking application account of the resource sharing initiator.

After the user logs in to an instant messaging application or to a social networking application and enters a resource sharing interface, the user identifier configured by the user is obtained.

Step 304: Obtain multimedia data.

In this embodiment, the multimedia data may include a multimedia file, or include a multimedia file and a multimedia identifier. The multimedia file may include one or two of an audio file or a video file.

The audio data may be a voice recorded by the resource sharing initiator, music selected by the resource sharing initiator, or audio data downloaded from a network by the resource sharing initiator. The audio data downloaded from the network may be audio data of different voices such as a female voice, a male voice, a child's voice, or a cartoon character's voice.

The video data may be a personalized video recorded by the resource sharing initiator, a video made by the resource sharing initiator, or a video downloaded from a network by the resource sharing initiator. A role in the video may use a cartoon character, a game role, a star character, or the user himself. A pre-determined time may be set in the recorded voice or video. This effectively limits the size of the voice or video data and can limit the size of occupied space.

The step of obtaining multimedia data includes: obtaining a real-time recorded multimedia file or a multimedia file selected locally or from a server.

Specifically, in the real-time recorded multimedia file, a recorded time may be limited.

Step 306: Obtain a resource sharing request, and associate the user identifier with the multimedia data according to the resource sharing request.

In this embodiment, the user identifier is associated with the multimedia data, that is, a correspondence is established between the user identifier and the multimedia data.

Step 308: Generate a resource sharing instruction according to an association relationship between the user identifier and the multimedia data.

In this embodiment, the resource sharing instruction is generated according to the association relationship between the user identifier and the multimedia data, and a control of "Send to share" or a control of "Determine to share" may be displayed on the terminal.

Step 310: Execute the resource sharing instruction.

Specifically, the control of "Send to share" or the control of "Determine to share" displayed on the terminal may be tapped to confirm. After the execution of the resource sharing instruction by the user is obtained, a resource message including the user identifier and the multimedia data may be generated according to the executed resource sharing instruction, or the user identifier and the multimedia data may be uploaded to the server according to the executed resource sharing instruction. The server generates, according to the user identifier and the multimedia data, the resource message including the user identifier and the multimedia data.

According to the resource sharing method, the multimedia data and the configured user identifier are obtained, the user identifier is associated with the multimedia data according to the resource sharing request, the resource sharing instruction is generated according to the association relationship between the user identifier and the multimedia data, and the resource sharing instruction is executed, so that the multimedia data can be carried during resource sharing, and types of information carried during resource sharing are expanded.

In an embodiment, the resource sharing method further includes: generating a resource message including the user identifier and the multimedia data; and sending the resource message including the multimedia data.

In this embodiment, the terminal or the server may generate, according to the user identifier and the multimedia data, the resource message including the user identifier and the multimedia data. The terminal or the server sends, to another user, the resource message including the user identifier and the multimedia data. The resource message may be sent to one person or a group. When the resource message is sent to a group, the user identifier in the resource message may further include the quantity of divided resources and allocation manners. The quantity, such as five or ten, may be set by a resource sharing initiator. The allocation manner may be: evenly distributing resources according to the quantity or randomly distributing resources according to the quantity.

In addition, the multimedia data selected from the generated resource message may be uploaded to the server as a template, to facilitate use of other users. Alternatively, the selected multimedia data and the identifier of the user may be uploaded to the server, and a mapping relationship between the multimedia data and the identifier of the user may be established, to facilitate subsequent selection and use of the user himself.

In an embodiment, the resource sharing method further includes: after the obtaining a resource sharing request, obtaining an identifier of a user that initializes the resource sharing request, determining whether the identifier of the user has permission to share a personalized resource, and if the identifier of the user has the permission, obtaining the multimedia data according to the resource sharing request, or if the identifier of the user does not have the permission, prompting the user to enable the permission to share the personalized resource.

Figure 4:
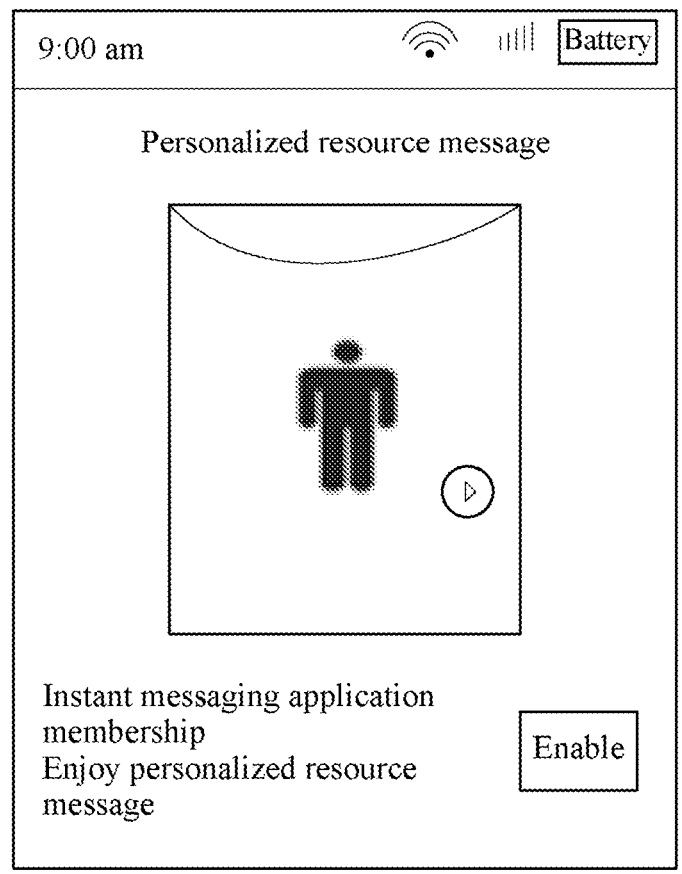
FIG. 4 is a schematic diagram of prompting to enable permission to share a personalized resource.

FIG. 4 is a schematic diagram of prompting to enable permission to share a personalized resource. As shown in FIG. 4, that an instant messaging application member has permission to share a personalized resource is prompted on a personalized resource permission enabling interface, and the user is prompted to enable an instant messaging application membership.

Figure 5:
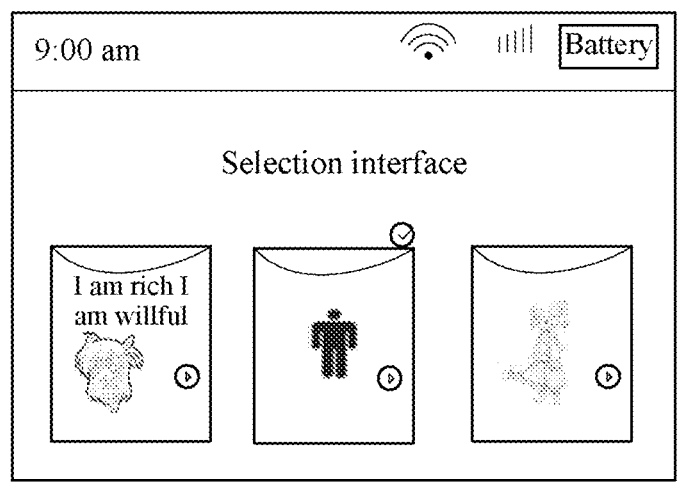
FIG. 5 is a schematic diagram of a video data role selection interface.

FIG. 5 is a schematic diagram of a video data role selection interface. As shown in FIG. 5, after a user enables an instant messaging application membership, many different roles are provided on the video data role selection interface for selection. For example, a first picture is a cartoon role. The cartoon role may be used as a role of multimedia data in a resource message, the cartoon role may be displayed on the surface of the resource message, and descriptions in words, such as "I am rich I am willful", may further be attached. A second picture is a star character. The star character may be used as a role of the multimedia data in the resource message, and the star character is displayed on the surface of the resource message. A third picture is a game role. The game role may be used as a role of the multimedia data in the resource message, and the game role is displayed on the surface of the resource message.

In an embodiment, the step of obtaining multimedia data in the resource sharing method includes: obtaining an identifier of a user and a real-time recorded multimedia file, and uploading the identifier of the user and the multimedia file to a server; and obtaining a multimedia identifier allocated by the server to the multimedia file.

In this embodiment, the server allocates the multimedia identifier to the multimedia data, and establishes an association relationship between the multimedia identifier and the identifier of the user.

The identifier of the user is an identifier that uniquely identifies a user identity, and may be an instant messaging account, a mobile phone number, a social networking application account of the resource sharing initiator. The multimedia identifier is an identifier that uniquely identifies the multimedia data.

An association relationship between the multimedia identifier and the identifier of the user is established, that is, a mapping relationship is established.

Further, when the multimedia identifier allocated by the server to the multimedia data is obtained, a resource sharing instruction is generated according to the association relationship between the user identifier and the multimedia identifier, and after the resource sharing instruction is executed, the user identifier and the multimedia identifier are uploaded to the server. The server finds the corresponding multimedia file according to the multimedia identifier, and generates, according to the user identifier and the multimedia file, the resource message including the user identifier and the multimedia data.

In an embodiment, the resource sharing method further includes: displaying a resource message generated after the step of executing the resource sharing instruction, providing a transparent layer on a resource message body of the resource message, and displaying the multimedia data at the transparent layer.

Specifically, the resource message body is a message structure of the resource message.

In an embodiment, the resource sharing method further includes: after the step of displaying the multimedia data at the transparent layer, displaying, at the transparent layer, a multimedia control configured to control playback of the multimedia data.

Specifically, the multimedia control may include a play/pause key. In addition, the multimedia control may further include one or more of a mute key, a voice key, a forward key, and a backward key.

Figure 6:
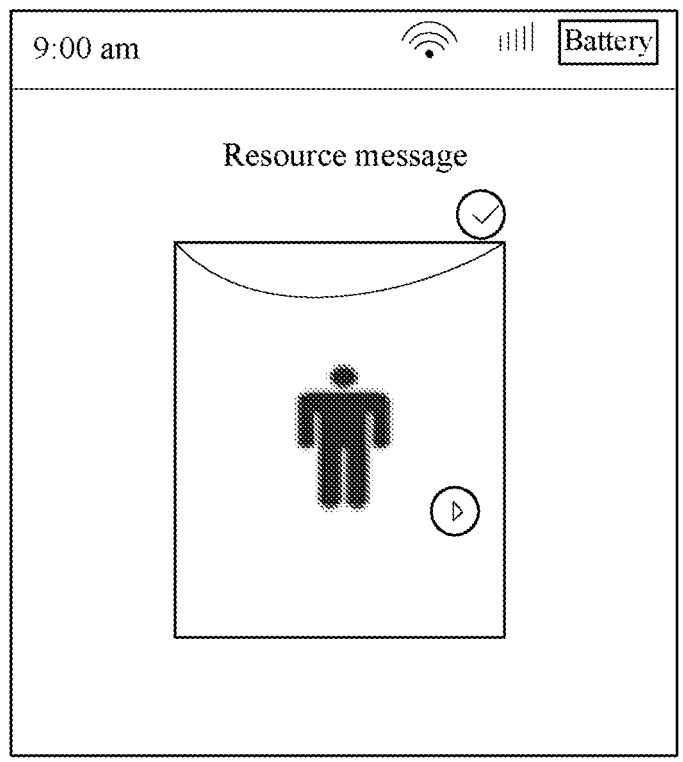
FIG. 6 is a schematic diagram of a generated resource message according to some embodiments of the present disclosure.

FIG. 6 is a schematic diagram of a generated resource message according to an embodiment. As shown in FIG. 6, a role image of multimedia data is configured and a play/pause key is provided on the surface of the resource message.

In an embodiment, the resource sharing method further includes: including a validity period in the generated resource message.

Figure 7:
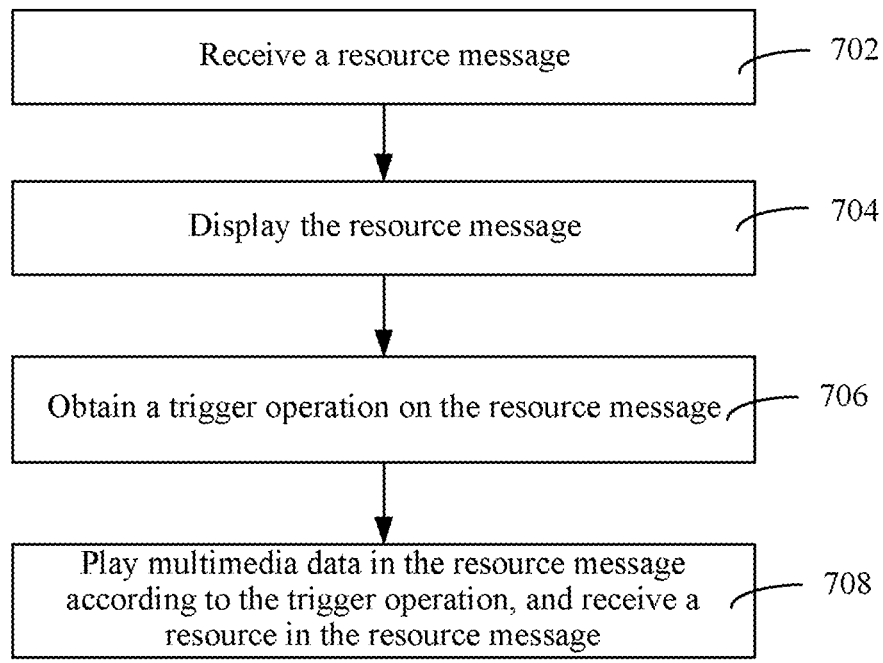
FIG. 7 is a flowchart of a resource sharing method according to some embodiments of the present disclosure.

FIG. 7 is a flowchart of a resource sharing method according to an embodiment. As shown in FIG. 7, the resource sharing method is described from the perspective of a resource receiving end, and includes the following steps:

Step 702: Receive a resource message.

Step 704: Display the resource message.

Step 706: Obtain a trigger operation on the resource message.

In this embodiment, the trigger operation on the resource message may be tapping the resource message.

After step 706, the resource sharing method further includes: obtaining an identifier of a resource receiver, determining whether the identifier of the resource receiver has permission to receive a resource in the resource message, and if the identifier of the resource receiver has permission to receive the resource in the resource message, allowing the resource receiver to receive the resource in the resource message, or if the identifier of the resource receiver does not have permission to receive the resource in the resource message, prohibiting the resource receiver to receive the resource in the resource message.

Step 708: Play multimedia data in the resource message according to the trigger operation, and receive a resource in the resource message.

According to the resource sharing method, the trigger operation is performed on the received and displayed resource message, the multimedia data in the resource message is played, and the resource in the resource message is received, so that the resource message carries the multimedia data, and types of information carried during resource sharing are expanded.

In an embodiment, a multimedia control is configured on the surface of the resource message; and the resource sharing method further includes: obtaining a trigger operation on the multimedia control to generate a corresponding control instruction; and playing the multimedia data according to the control instruction.

The multimedia control may include a play/pause key, a voice key, a mute key, and the like. Different control instructions are generated for different key trigger operations, and the multimedia data is played according to the control instructions. For example, if the mute key is triggered, a mute instruction is generated, and the multimedia data is played in a mute play mode.

In an embodiment, the resource sharing method further includes: after the obtaining a trigger operation on the resource message, determining whether the resource in the resource message is overdue; and if yes, receiving prompt information indicating that the resource is overdue, or if not, receiving the resource in the resource message.

In an embodiment, the resource sharing method further includes: after the obtaining a trigger operation on the resource message, determining whether the resource in the resource message is fully accepted, and if yes, receiving prompt information indicating that the resource is fully accepted, or if not, receiving a resource that is evenly allocated according to the quantity, or receiving a resource that is randomly allocated from a remaining resource.

Figure 8:
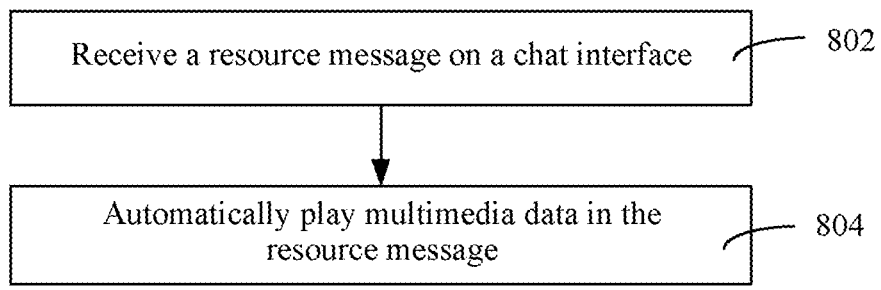
FIG. 8 is a flowchart of a resource sharing method according to another embodiment.

FIG. 8 is a flowchart of a resource sharing method according to another embodiment. As shown in FIG. 8, in an embodiment, a transparent layer is provided on a resource message body of a resource message, and multimedia data and a multimedia control that is configured to control playback of the multimedia data are displayed at the transparent layer.

A resource sharing method includes the following steps:

Step 802: Receive a resource message on a chat interface.

In this embodiment, the chat interface may be a chat interface of a two-person session or a chat interface of a group session.

Step 804: Automatically play multimedia data in the resource message.

In this embodiment, playback may end after the multimedia data in the resource message is automatically played once.

According to the resource sharing method, after the resource message is received on the chat interface, the multimedia data in the resource message is automatically played and does not need a trigger operation by a receiver, so that an operation is simplified.

An implementation process of the resource sharing method is described below with reference to a specific application scenario. For example, the resource message is a red packet, the resource is the amount of money in the red packet, and the session is a two-person session. The resource sharing method includes the following steps:

(1) A first terminal obtains a red packet sending request initiated by a first user, enters a video data selection interface according to the red packet sending request, obtains a star character selected by the first user on the video data selection interface as video data of a video data role.

Figure 9:
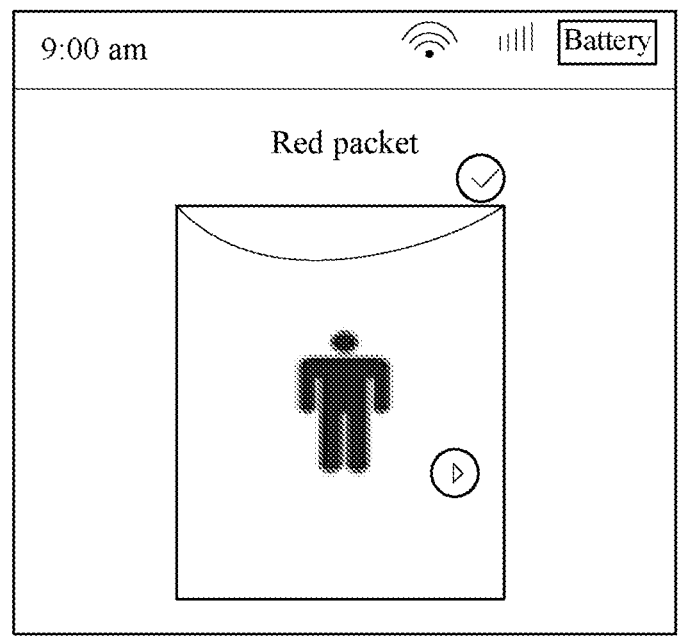
FIG. 9 is a schematic diagram of selecting a star character on a video data selection interface according to some embodiments of the present disclosure.

As shown in FIG. 9, the star character is selected on the video data selection interface as the video data of the video data role.

(2) The first terminal generates a red packet according to the selected video data, an identifier of the first user, and the amount of money, provides a transparent layer on a message body of the red packet, displays the star character of the video data at the transparent layer, and provides a play/pause key at the transparent layer of the message body of the red packet.

(3) The first terminal sends, to a second user by using an instant messaging session window, the red packet that is sent by the first user to the second user.

Figure 10:
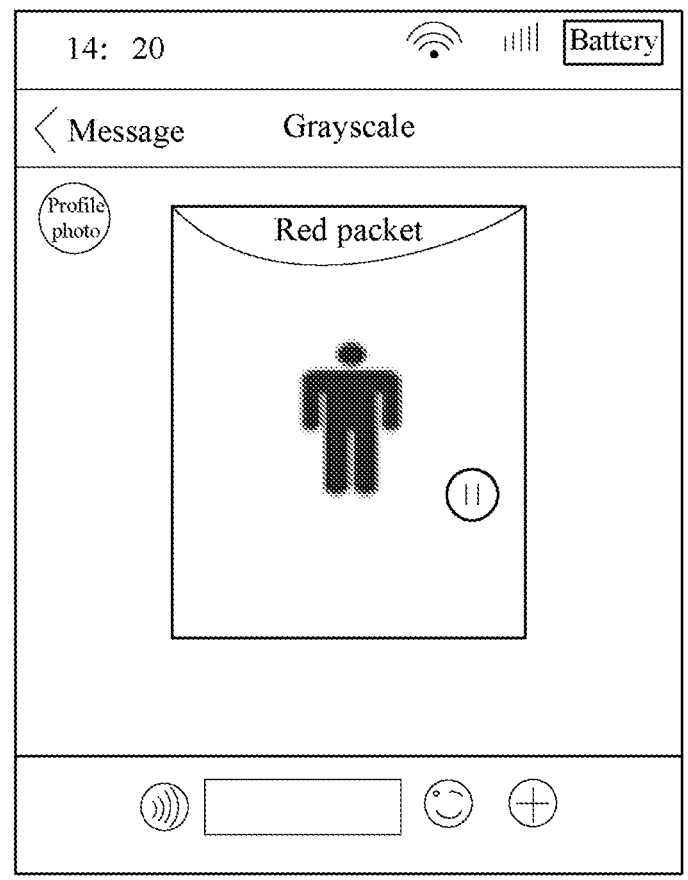
FIG. 10 is a schematic diagram of sending a red packet on a two-person session interface according to some embodiments of the present disclosure.

As shown in FIG. 10, the red packet is sent on the two-person session interface, and the star character of the video data and the play/pause key are displayed at the transparent layer on the message body of the red packet.

(4) After the second user receives the red packet on the chat interface by using a second terminal, the second user plays the video data in the red packet, accepts the amount of money, and displays the alias of the first user and description in words.

Figure 11:
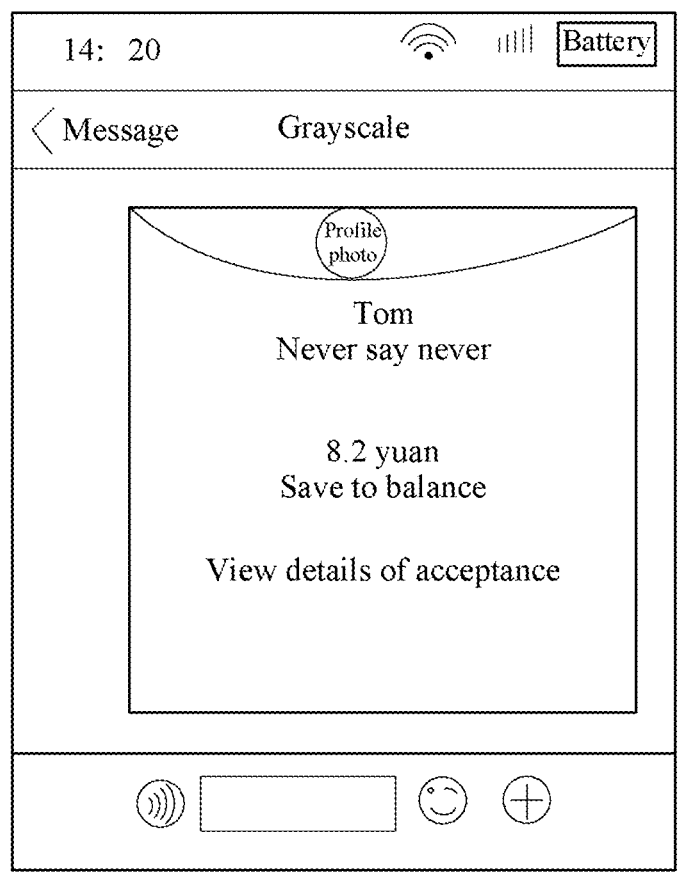
FIG. 11 is a schematic diagram of accepting a red packet according to some embodiments of the present disclosure.

As shown in FIG. 11, after the second user receives the red packet on the two-person session interface, the second user taps the red packet, and accepts 8.2 yuan. Tom is displayed as the first user, the description in words of "Never say never" is displayed, and a control for "View details of acceptance" is provided.

The accepted red packet and a corresponding amount of money may be viewed.

For example, the resource message is a red packet, the resource is the amount of money in the red packet, and the session is a group session. The resource sharing method includes the following steps:

(1) A first terminal obtains a red packet sending request initiated by a first user to a group A that the first user is in, enters a video data selection interface according to the red packet sending request, obtains a star character that is selected by the first user on the video data selection interface as video data of a video data role.

(2) The first terminal generates a red packet according to the selected video data, an identifier of the first user, and the amount of money, displays the star character of the video data at a transparent layer on a message body of the red packet, and provides a play/pause key at the transparent layer of the message body of the red packet.

In this embodiment, the first terminal may further obtain the quantity of which the amount of money in the red packet is divided and a division manner. The division manner may be an even division, a random division, or the like.

(3) The first terminal sends, to a second user by using an instant messaging session window, the red packet sent by the first user to the second user.

Figure 12:
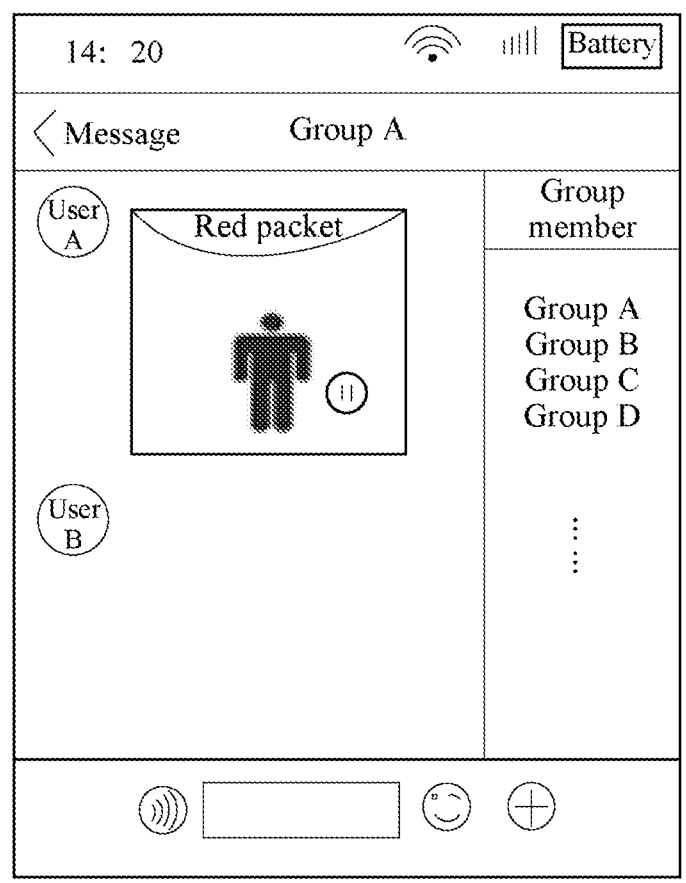
FIG. 12 is a schematic diagram of sending a red packet on a group session interface according to some embodiments of the present disclosure.

As shown in FIG. 12, the red packet is sent on the group session interface, and the star character of the video data and the play/pause key are displayed on the surface of the red packet.

(4) After members in the group receive the red packet on the chat interface by using a second terminal, the members play the video data in the red packet, accept the amount of money, and display the alias of the first user and description in words.

Figure 13:
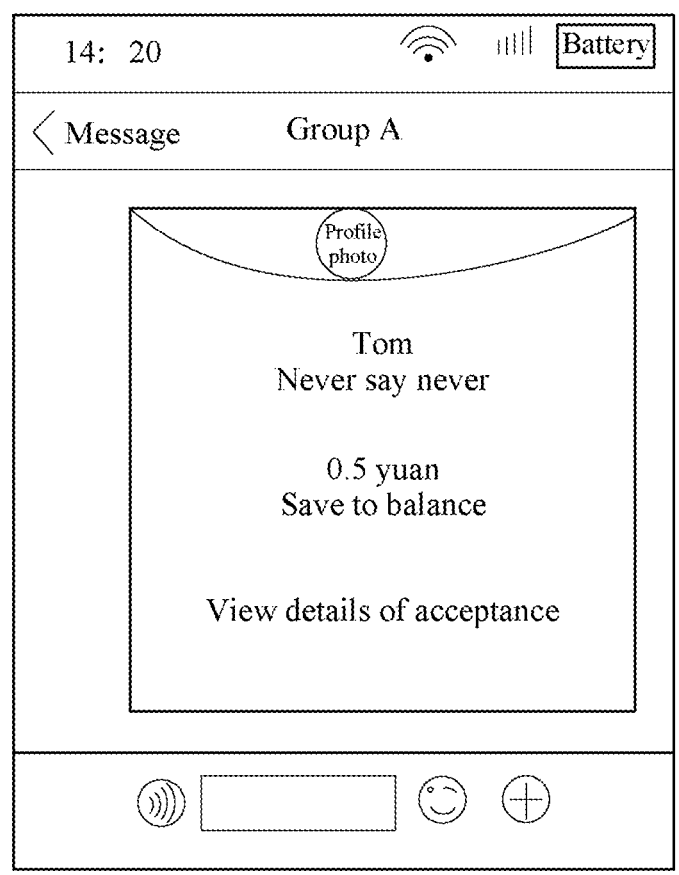
FIG. 13 is a schematic diagram of accepting a red packet on a group session interface according to some embodiments of the present disclosure.

As shown in FIG. 13, after receiving the red packet on the group session interface, the second user taps the red packet, and accepts 0.5 yuan. Dai Xingxing is displayed as the first user, the description in words of "Diligence is the path to the mountain of knowledge, hard-working is the boat to the endless sea of learning" is displayed, a control for "View details of acceptance" is provided, and which users that accept the red packets and the amounts of money corresponding to the red packets may be viewed.

For example, the resource message is a red packet, the resource is the amount of money in the red packet, and the red packet type is a New Year greeting red packet. The resource sharing method include the following steps:

(1) The first terminal obtains a New Year greeting red packet sending request initiated by the first user, prompts, according to the New Year greeting red packet, the first user to record a voice or video data with a pre-determined time, and uploads the voice or the video data to a server. The server allocates a unique voice identifier to the voice, allocates a unique video identifier to the video data, and establishes an association relationship between the voice identifier and the video identifier and the identifier of the first user.

Specifically, the recorded voice or video data may be "Happy New Year!" and the like, and is not limited thereto.

(2) The first terminal obtains basic information of a red packet entered by the first user, generates the red packet by using the basic information of the red packet and the recorded voice or video data, and sends the red packet to a person or a group.

(3) After receiving the red packet, a second user taps to accept the red packet, and the voice or the video data is automatically played on a second terminal that the second user is on.

Figure 14:
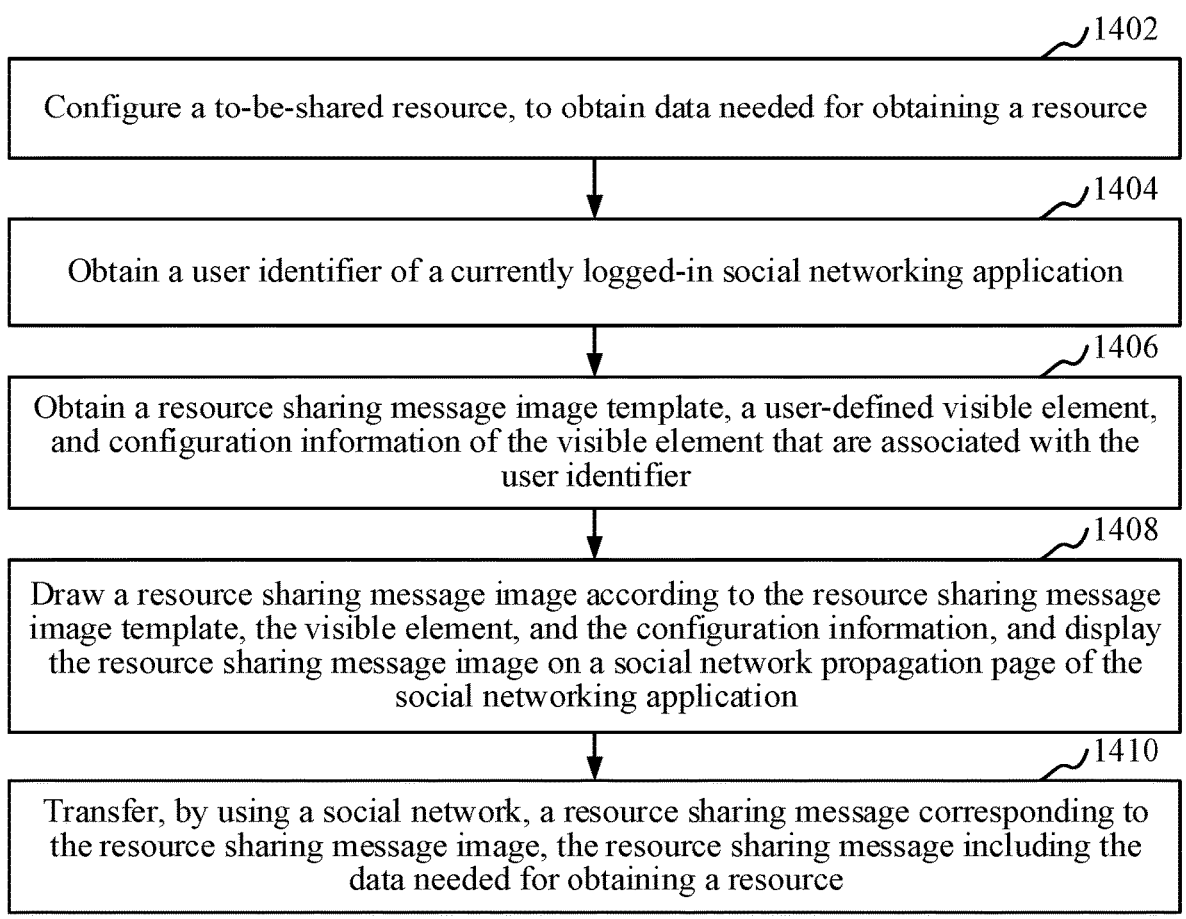
FIG. 14 is a schematic flowchart of a resource sharing method according to some embodiments of the present disclosure.

As shown in FIG. 14, in an embodiment, a resource sharing method is provided. This embodiment is described by using an example in which the method is applied to the terminal 110 shown in FIG. 1 and FIG. 2. The method specifically includes following steps:

Step 1402: Configure a to-be-shared resource, to obtain data needed for obtaining a resource.

Specifically, the terminal may receive a resource sharing instruction, trigger to enter a resource configuration page according to the resource sharing instruction, and display configuration items of the to-be-shared resource on the resource configuration page, so as to obtain a configuration parameter of the to-be-shared resource according to configuration instructions for all the configuration items. The configuration items are for example, a resource type, a resource share, a resource allocation manner, and an attribute of a user capable of obtaining a resource that are of the to-be-shared resource. The configuration parameter is a specific value after the configuration items are configured. The resource type is for example, a currency red packet type, a physical red packet type, or a voucher red packet type. The resource share is for example, a currency amount, and a resource allocation manner such as even distribution or random distribution. The attribute of the user capable of obtaining the resource means that only friends or only group members can obtain the red packet. Step 1402 may be performed after step 1406.

The data needed for obtaining a resource is data needed for obtaining the to-be-shared resource, and may include a resource identifier that is used to uniquely identify the to-be-shared resource; or may include a user identifier that is used to identify a user that initiates a resource sharing message; and may further include information about a validity period of the resource sharing message.

Step 1404: Obtain a user identifier of a currently logged-in social networking application.

The social networking application is an application for social networking and interaction based on a social network. The social networking application generally has a contact searching function and an instant messaging function, and may further have a user generated content (UGC) sharing function and a UGC commenting function. The social networking application may be an instant messaging application, a social network sites (SNS) application, or the like.

The user identifier, of the currently logged-in social networking application, obtained by the terminal may be an account entered by the user when the user logs in to the social networking application, or may be a unique character string generated according to the account.

Step 1406: Obtain a resource sharing message image template, a user-defined visible element, and configuration information of the visible element that are associated with the user identifier.

Specifically, the terminal may perform query locally or query a server for the resource sharing message image template, the user-defined visible element, and the configuration information of the visible element that are associated with the user identifier. The resource sharing message image template, the user-defined visible element, and the configuration information of the visible element are used to draw a resource sharing message image, and may be collectively referred to as drawn data for ease of description.

In an embodiment, the terminal may determine whether locally there stores the drawn data, if locally there stores the drawn data, query the server whether a change occurs in the drawn data corresponding to the user identifier, in a time period from a time when the drawn data is obtained last time to a current time; and if no change occurs, directly locally obtain the drawn data corresponding to the user identifier; or if a change occurs or if locally there does not store the drawn data, query the server for the drawn data corresponding to the user identifier.

The resource is an object whose ownership can be obtained by using a network and includes at least one of a virtual object and a physical object. The virtual object includes at least one of an account value, a virtual image product, a virtual prepaid card, game equipment, and virtual currency. The physical object may be an object that can be arbitrarily owned by the user and that has an actual form, and is for example, an electronic product, a toy, an artifact, and a signed photo.

The resource sharing message image is an image that is displayed when a resource message is displayed, and the resource sharing message image template is a template-assisted resource sharing message image. The resource sharing message image template constrains overall attributes such as the overall shape and size of the resource sharing message image, and may further limit information about the shape, the size, and the location of an editing area that is used to accommodate the user-defined visible element.

The visible element refers to data that can be displayed and that is visible to human eyes, and is used to transfer information. The visible element may include a combination of one or more of a character, a picture, and an animated file. The format of the picture may use a JPEG format (a picture format, and an image compression standard that is specified by a Joint Photographic Experts Group), a PNG format (full name: Portable Network Graphic Format, meaning a portable network graphic format), or another custom image format. The image may include a static image and a dynamic image, and the dynamic image may use the GIF format (full name: Graphics Interchange Format). The animated file may use an SWF format (full name: shock wave flash, a FLASH animated file format provided by the Adobe company) or another custom animated file format.

The configuration information of the visible element is used to describe an attribute of the user-defined visible element, and a relationship between the user-defined visible element and the resource sharing message image template. The configuration information of the visible element may specifically include the size of the visible element, and the location of the visible element relative to the resource sharing message image template.

For example, if the visible element includes a character, the corresponding configuration information may include for example, a font, a word space, a word size, an alignment format, and a character color that are used to describe information about the attribute of the character, and may further include the location of the character in a corresponding resource sharing message image template. If the visible element includes an image, the corresponding configuration information may include a transparency degree and the location of the image in the resource sharing message image template.

Step 1408: Draw a resource sharing message image according to the resource sharing message image template, the visible element, and the configuration information, and display the resource sharing message image on a social network propagation page of the social networking application.

Specifically, the terminal mixes the resource sharing message image template with the visible element according to the configuration information of the visible element, to draw the resource sharing message image. Further, the terminal may draw the visible element according to information that is used to describe the attribute of the visible element and that is in the configuration information, and mix the visible element with the resource sharing message image template according to information that is used to describe information about the location and that is in the configuration information.

The social network propagation page is a page that is of the social networking application and that can be accessed by a social friend and that can propagate a message, and is for example, a session page, a UGC sharing page, or a personal page that can be accessed by the public. The session page includes a one-to-one session page and a group session page.

Step 1410: Transfer, by using a social network, a resource sharing message corresponding to the resource sharing message image, the resource sharing message including the data needed for obtaining a resource.

Specifically, the terminal may generate a resource sharing message corresponding to the resource sharing message image, and propagate the resource sharing message by using a message channel of the social network. A propagation object is related to the type of the social network propagation page. For example, if the social network propagation page is the one-to-one session page, the propagation object may be an identifier of another user who is in a session with a current user; or if the social network propagation page is the group session page, the propagation object may be all group members except the current user identifier in a current group.

The resource sharing message includes the data needed for obtaining a resource, and further includes the resource sharing message image, or data used to obtain the resource sharing message image. The data needed for obtaining a resource may include a resource identifier used to uniquely identify a resource that can be obtained; or may include a user identifier used to identify the user that initiates the resource sharing message; or may include a validity period of the resource sharing message. The data used to obtain the resource sharing message image may be the user identifier, or may be an access address of the resource sharing message image, or may be the resource sharing message image template, the user-defined visible element, and an access address of the configuration information of the visible element that are associated with the user identifier.

According to the resource sharing method, a user defines the visible element, and associates the resource sharing message image template, the visible element, and the configuration information of the visible element with the user identifier, so that when the user needs to share a resource, the user can obtain the resource sharing message image template, the visible element, and the configuration information according to the user identifier, so as to complete drawing of the resource sharing message image. The resource sharing message image is displayed on the social network propagation page of the social networking application, and the resource is shared by transferring the resource sharing message by using the social network. The resource sharing message image has the user-defined visible element, so that the resource sharing message can be conveniently and efficiently identified.

In an embodiment, the method further includes: playing custom audio when the resource sharing message image is displayed on the social network propagation page. The audio may be user-defined audio, or may be specifically real-time recorded audio, or may be audio selected locally, or may be audio selected from an audio set provided on the server.

In an embodiment, the method further includes: obtaining an identifier of the audio, and step S1410 includes: generating a resource sharing message including the data needed for obtaining a resource and the identifier of the audio, where the resource sharing message corresponds to the transferred resource sharing message image; and transferring the resource sharing message by using the social network.

The identifier of the audio is used to uniquely identify corresponding audio. The identifier of the audio is used to obtain the audio and play the audio. The audio may be specifically music or a voice. The identifier of the audio may be a uniform resource locator (URL) of the audio, and the URL of the audio may be generated by the terminal after the terminal uploads the audio to the server.

In this embodiment, the resource sharing message propagated by using the social network can not only be used to share the resource, but also play particular audio at a receiving end, so as to increase an amount of transferred information.

Figure 15:
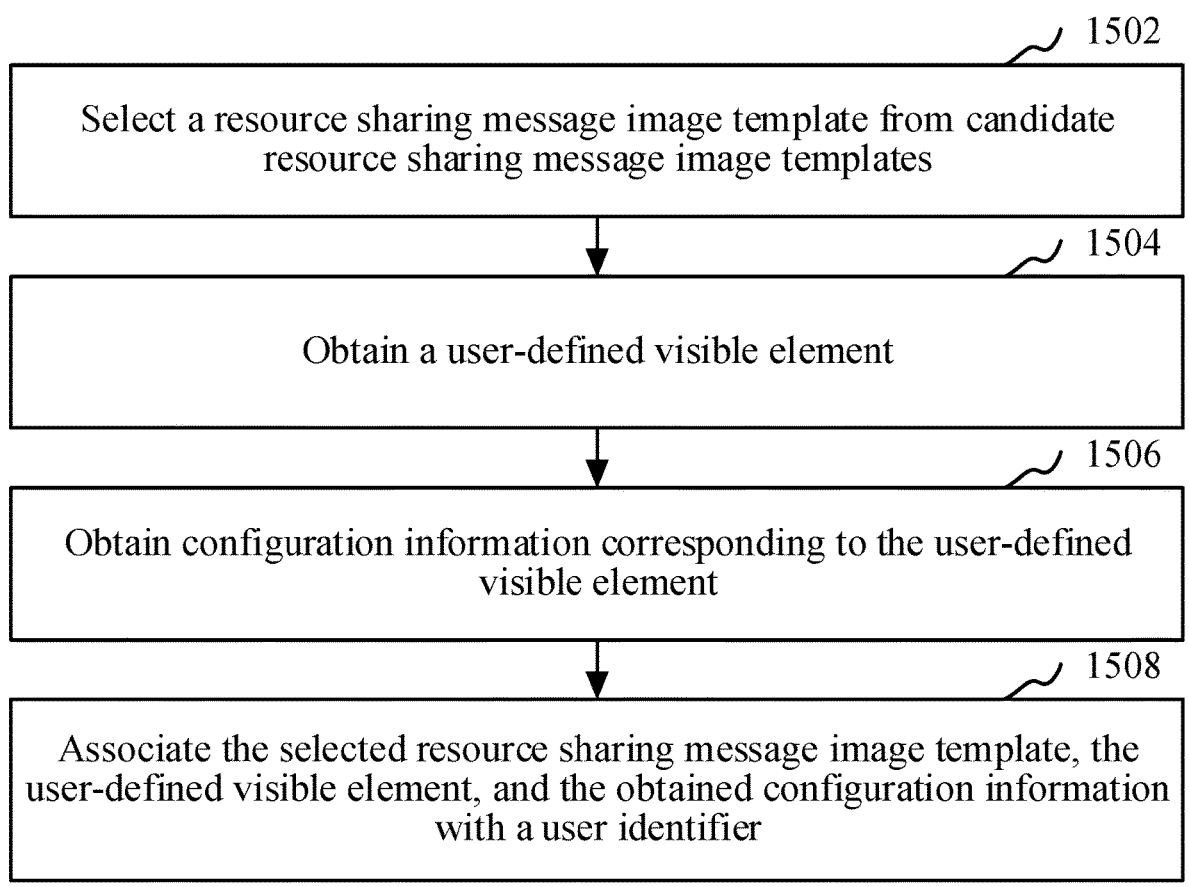
FIG. 15 is a schematic flowchart of steps of self-configuring a resource sharing message image template according to some embodiments of the present disclosure.
Figure 16:
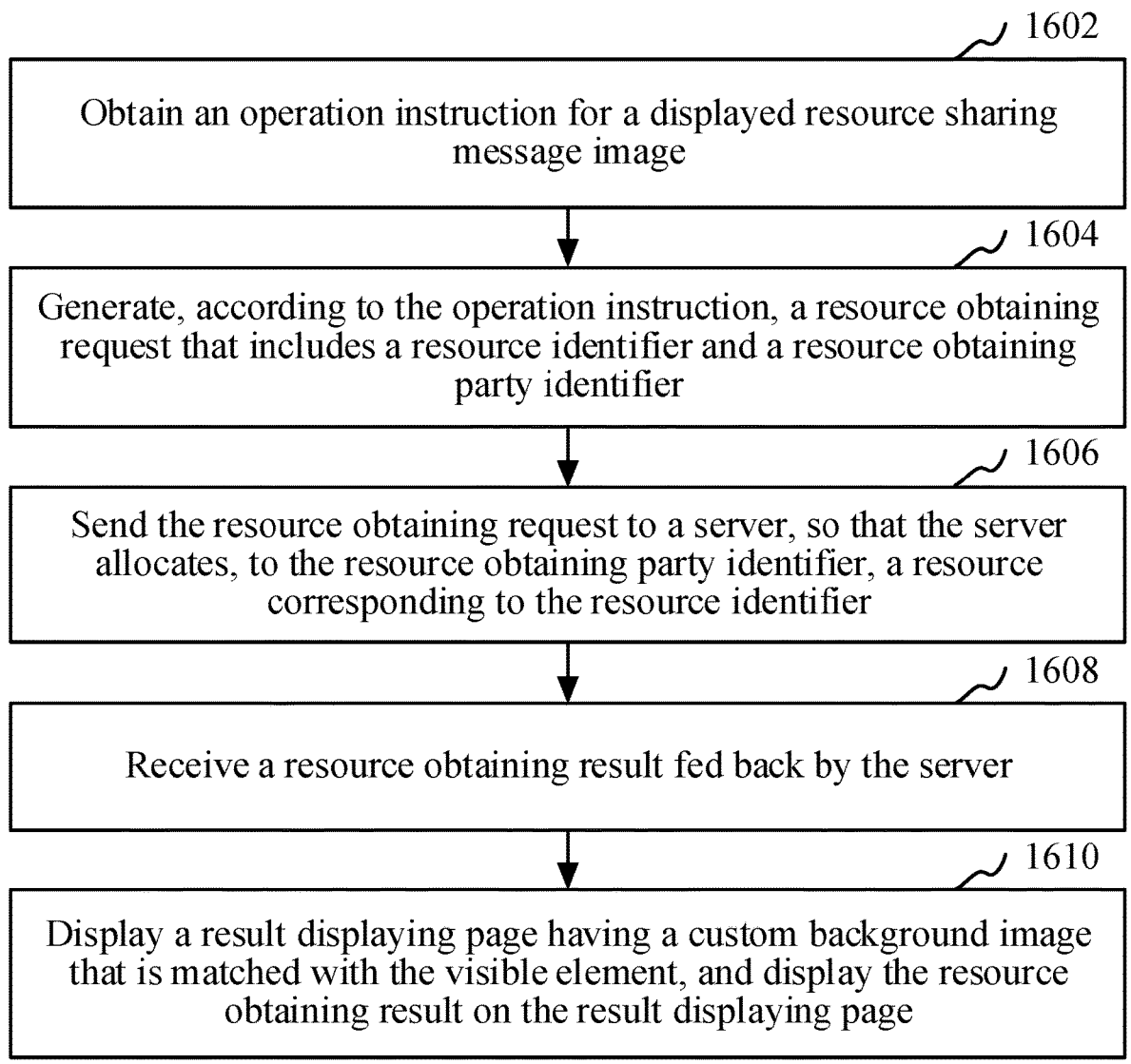
FIG. 16 is a schematic flowchart of steps of obtaining a resource according to some embodiments of the present disclosure.
Figure 17:
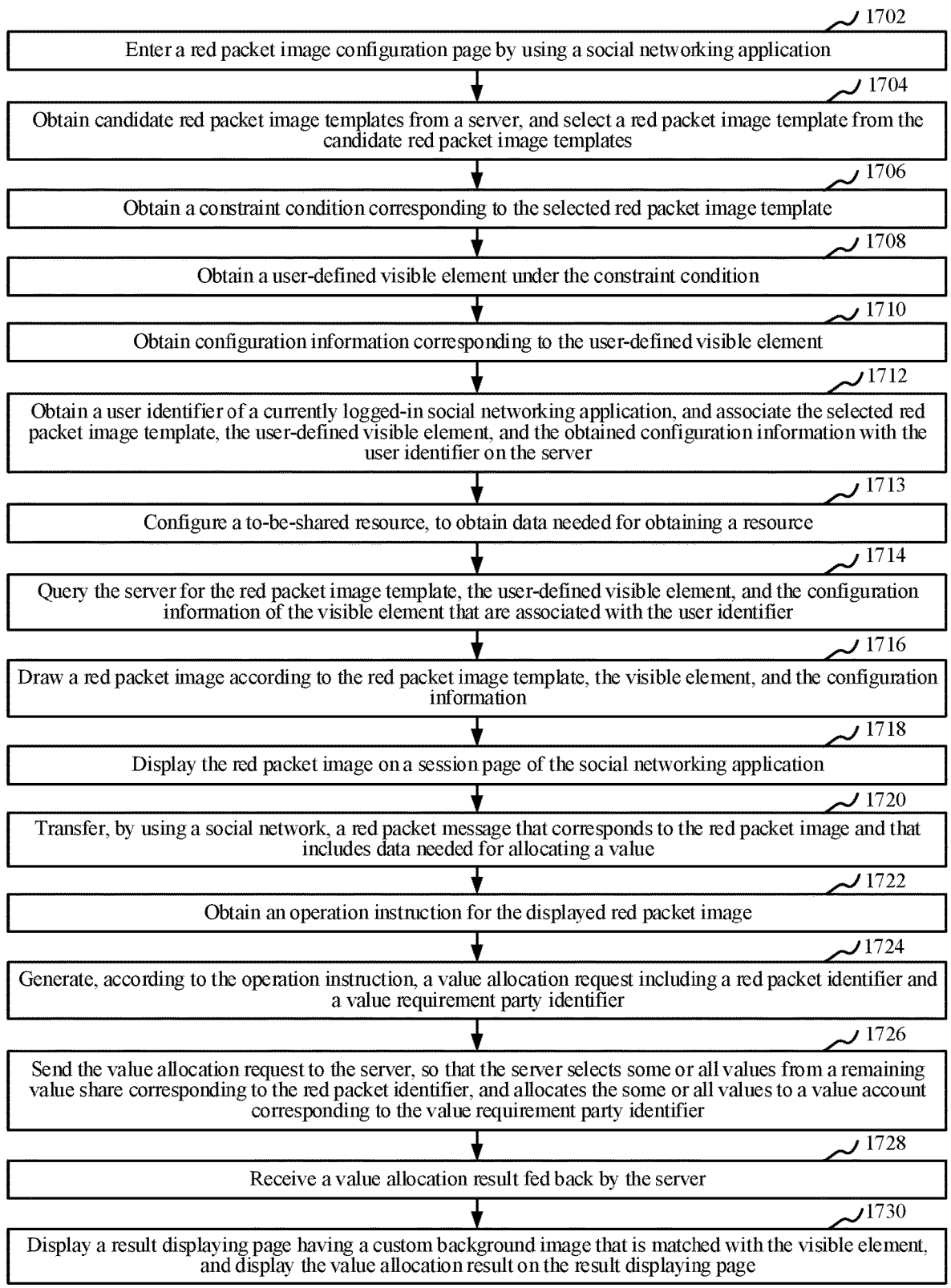
FIG. 17 is a schematic flowchart of a resource sharing method according to another embodiment.

As shown in FIG. 15, in an embodiment, the resource sharing method further includes steps of customizing a resource sharing message image template, and specifically includes the following steps:

Step 1502: Select a resource sharing message image template from candidate resource sharing message image templates.

Specifically, the terminal may detect an operation on a resource sharing message image configuration control on the social network propagation page, so as to enter a resource sharing message image configuration page according to the detected operation. The detected operation may be manners such as touching and holding, tapping, sliding, and multi-touch.

The terminal pulls the candidate resource sharing message image template list from the server and displays the candidate resource sharing message image template list on the resource sharing message image configuration page, receives a user selection instruction, and selects the resource sharing message image template from the candidate resource sharing message image templates according to the user selection instruction.

Step 1504: Obtain a user-defined visible element.

Specifically, the terminal may obtain a character entered by the user, or select a picture or an animated file according to a user selection instruction. In an embodiment, if the terminal does not detect an operation of defining a visible element by the user, the user obtains a default visible element of the selected resource sharing message image template, and uses the default visible element as the user-defined visible element.

In an embodiment, the terminal may display a preview image that is of the resource sharing message image and that is generated by adding the visible element to an editing area of the selected resource sharing message image template. In this way, the user can preview the resource sharing message image, and accurately learn a result of defining the visible element by the user.

Step 1506: Obtain configuration information corresponding to the user-defined visible element.

Specifically, after receiving an instruction that is of determining the configuration that is triggered by the user, the terminal may obtain the configuration information corresponding to the user-defined visible element. The obtained configuration information may include configuration information input by the user and configuration information that is automatically calculated.

Step 1508: Associate the selected resource sharing message image template, the user-defined visible element, and the obtained configuration information with a user identifier.

Specifically, the terminal may associate the selected resource sharing message image template, the user-defined visible element, and the obtained configuration information with a user identifier on the server. The terminal may transfer the user identifier, an identifier of the resource sharing message image template, the user-defined visible element, and the corresponding configuration information to the server, and the server associates the selected resource sharing message image template, the user-defined visible element, and the obtained configuration information with the user identifier.

In this embodiment, by means of a self-defined configuration, the user can freely select the resource sharing message image template from the candidate resource sharing message image templates as he intends, and can define the visible element corresponding to the selected resource sharing message image template. In this way, a probability that different users have a same resource sharing message image is further decreased, and identifiability of the resource sharing message is further enhanced.

In an embodiment, before step 1504, the method further includes: obtaining a constraint condition corresponding to the selected resource sharing message image template; and step 1504 includes obtaining the user-defined visible element under the constraint condition.

The constraint condition is a condition that the user-defined visible element should satisfy, may include a constraint on the attribute of the visible element, and may further include a constraint on the location of the visible element relative to the selected resource sharing message image template. For example, the constraint condition may be a constraint on the size, the quantity, the location, the color, the transparency degree, and the like of the visible element.

Specifically, the server pre-stores a constraint condition corresponding to each resource sharing message image template, and the terminal may obtain the constraint condition corresponding to the selected resource sharing message image template from the server after selecting the resource sharing message image template. The terminal may display a prompt of the constraint condition, to guide the user to input or select as quickly as possible, according to the constraint condition, the visible element meeting the constraint condition.

When obtaining the user-defined visible element under the constraint condition, the terminal may specifically determine whether the visible element on which the user-defining operation has been performed satisfies the constraint condition, and reject the user-defining operation if the visible element does not satisfy the constraint condition; or accept the user-defining operation if the visible element satisfies the constraint condition. The user-defining operation may be, for example, uploading the visible element, increasing the quantity of visible elements, modifying the size of the visible element, or moving the location of the visible element.

In an embodiment, the selected resource sharing message image template has the corresponding constraint condition, and the visible element is obtained under the constraint condition and is associated with the user identifier. In this way, an error that occurs during drawing of the resource sharing message image can be avoided, so as to avoid incorrect resource sharing.

As shown in FIG. 5, in an embodiment, the resource sharing method further includes steps of obtaining a resource, and specifically includes the following steps:

Step 1602: Obtain an operation instruction for a displayed resource sharing message image.

Specifically, the terminal that initiates resource sharing may obtain the operation instruction for the displayed the resource sharing message image; and a terminal that receives a resource sharing message may display the resource sharing message image according to the received resource sharing message, and obtain the operation instruction for the displayed resource sharing message image. The operation instruction may be triggered in manners such as touching and holding, tapping, sliding, and a multi-touch.

Step 1604: Generate, according to the operation instruction, a resource obtaining request that includes a resource identifier and a resource obtaining party identifier.

Specifically, the terminal extracts the resource identifier from the resource sharing message according to the operation instruction, and generates the resource obtaining request that includes the resource identifier and the resource obtaining party identifier. The resource obtaining party identifier may be an identifier of a user that requests to obtain a resource, or may be a user identifier to which the terminal triggering the operation instruction logs in.

In an embodiment, the terminal may extract the resource identifier from the resource sharing message according to the operation instruction, and query the server whether the currently logged-in user identifier has permission to obtain a resource corresponding to the resource identifier; and generate, according to the operation instruction, the resource obtaining request including the resource identifier and the resource obtaining party identifier if the currently logged-in user identifier has the permission to obtain the resource corresponding to the resource identifier; or skip performing an action or prompting that the extraction fails if the currently logged-in user identifier does not have the permission to obtain the resource corresponding to the resource identifier.

In an embodiment, the method further includes: obtaining, according to the operation instruction, custom audio corresponding to the resource sharing message image, and playing the audio. In this embodiment, when the resource is obtained, the custom audio may be played, more amount of information may be transferred, and that the action of obtaining the resource occurs may be reminded.

Step 1606: Send the resource obtaining request to a server, so that the server allocates, to the resource obtaining party identifier, a resource corresponding to the resource identifier.

Specifically, the terminal sends the resource obtaining request to the server, and the server obtains the resource identifier and the resource obtaining party identifier according to the resource obtaining request, so as to allocate, to the resource obtaining party identifier, the resource corresponding to the resource identifier. After receiving the resource obtaining request, the server determines whether there is a remaining share in the resource corresponding to the resource identifier, and if there is the remaining share, allocates, to the resource obtaining party identifier, a resource from the remaining resource, decreases a corresponding share, and feeds back, to the terminal, a resource obtaining result indicating that the resource is successfully obtained; or if there is no remaining share, directly feeds back, to the terminal, a resource obtaining result indicating that the resource is not successfully obtained.

When the server allocates a resource, if the resource is a resource that is to be allocated as per a value, such as a value of a virtual red packet or a prepaid card, when the server allocates a resource to the resource obtaining party identifier, the server may select a value from a preset value range randomly or according to a preset fixed value, and transfer the value into a value account corresponding to the resource obtaining party identifier. The value account includes a cash account or a voucher account, and the value account may be set on a bank server or a third-party payment server. If the resource is a resource that can be obtained after registration, such as a physical object, when the server allocates the resource to the resource obtaining party identifier, the server may record a correspondence between the resource and the resource obtaining party identifier to represent an ownership of a corresponding user on the resource, so that the resource is subsequently provisioned in other forms.

Step 1608: Receive a resource obtaining result fed back by the server.

Specifically, the resource obtaining result includes a result indicating that the resource is successfully obtained and a result indicating that the resource is not successfully obtained. The terminal receives the resource obtaining result fed back by the server after the server allocates the resource. The result indicating that the resource is successfully obtained further includes description information of the obtained resource, for example, the value of accepted red packets.

Step 1610: Display a result displaying page having a custom background image that matches the visible element, and display the resource obtaining result on the result displaying page.

Specifically, the terminal displays the result displaying page, the result displaying page has a custom background image, the custom background image matches the visible element, and the terminal displays the resource obtaining result on the result displaying page. The custom background image matches the visible element. Specifically, the custom background image may be an image obtained after the visible element is zoomed in or zoomed out, or may be an image obtained after the visible element is re-arranged. The custom background image may be fused with the result displaying page in a watermark manner.

In this embodiment, the resource sharing message image may trigger an action of obtaining a resource, and display the resource obtaining result on the result displaying page. The result displaying page has a custom background image that matches the visible element, so that more information can be transferred, and interaction manners between users are added.

In an embodiment, step 1406 includes: querying a server for the resource sharing message image template, the user-defined visible element, and the configuration information of the visible element that are associated with the user identifier; perform step 1408 if the resource sharing message image template, the user-defined visible element, and the configuration information of the visible element that are associated with the user identifier are found; and obtaining a resource sharing instruction, and performing, according to the resource sharing instruction, the step of displaying the resource sharing message image on a social network propagation page of the social networking application.

Specifically, before initiating resource sharing, for example, after logging in to the social networking application, or after completing customized configuration of the resource sharing message image template, the terminal may query the server for the resource sharing message image template, the user-defined visible element, and the configuration information of the visible element that are associated with the user identifier. If the resource sharing message image template, the user-defined visible element, and the configuration information of the visible element that are associated with the user identifier are found, the resource sharing message image is drawn according to drawn data found in a memory. If the resource sharing message image template, the user-defined visible element, and the configuration information of the visible element that are associated with the user identifier are not found, it indicates that the user does not customize the resource sharing message image template, and a default resource sharing message image on social networking application is used in subsequent resource sharing.

When the terminal detects an action that triggers to share a resource, for example, when a button for sharing a resource is pressed down, a corresponding resource sharing instruction is obtained. The terminal completes a resource configuration on the server according to the resource sharing instruction, and obtains data needed for obtaining a resource corresponding to the configured resource. The resource configuration is for example, a configuration of a resource type, a configuration of a resource share, and a configuration of a resource allocation manner.

In this embodiment, after the drawn data is found in the server, the resource sharing message image may be drawn in advance in the memory, so that when an operation of resource sharing is performed, the resource sharing message image that is drawn in advance in the memory may be immediately displayed on the social network propagation page. Drawing takes more time than displaying does. Therefore, by drawing the resource sharing message image in advance, the resource sharing efficiency is dramatically improved.

In an embodiment, a resource sharing message image template is a red packet image template, a resource sharing message image is a red packet image, a resource sharing message is a red packet message, a red packet message a special message, social network propagation page is a session page, and a resource sharing message image configuration page is a red packet image configuration page. A red packet is a gift having an attribute of a currency equivalent, and a virtual red packet is a red packet in an electronic format and is processed by a computer. As shown in FIG. 15, a resource sharing method specifically includes the following steps:

Step 1702. Enter a red packet image configuration page by using a social networking application.

Figure 18:
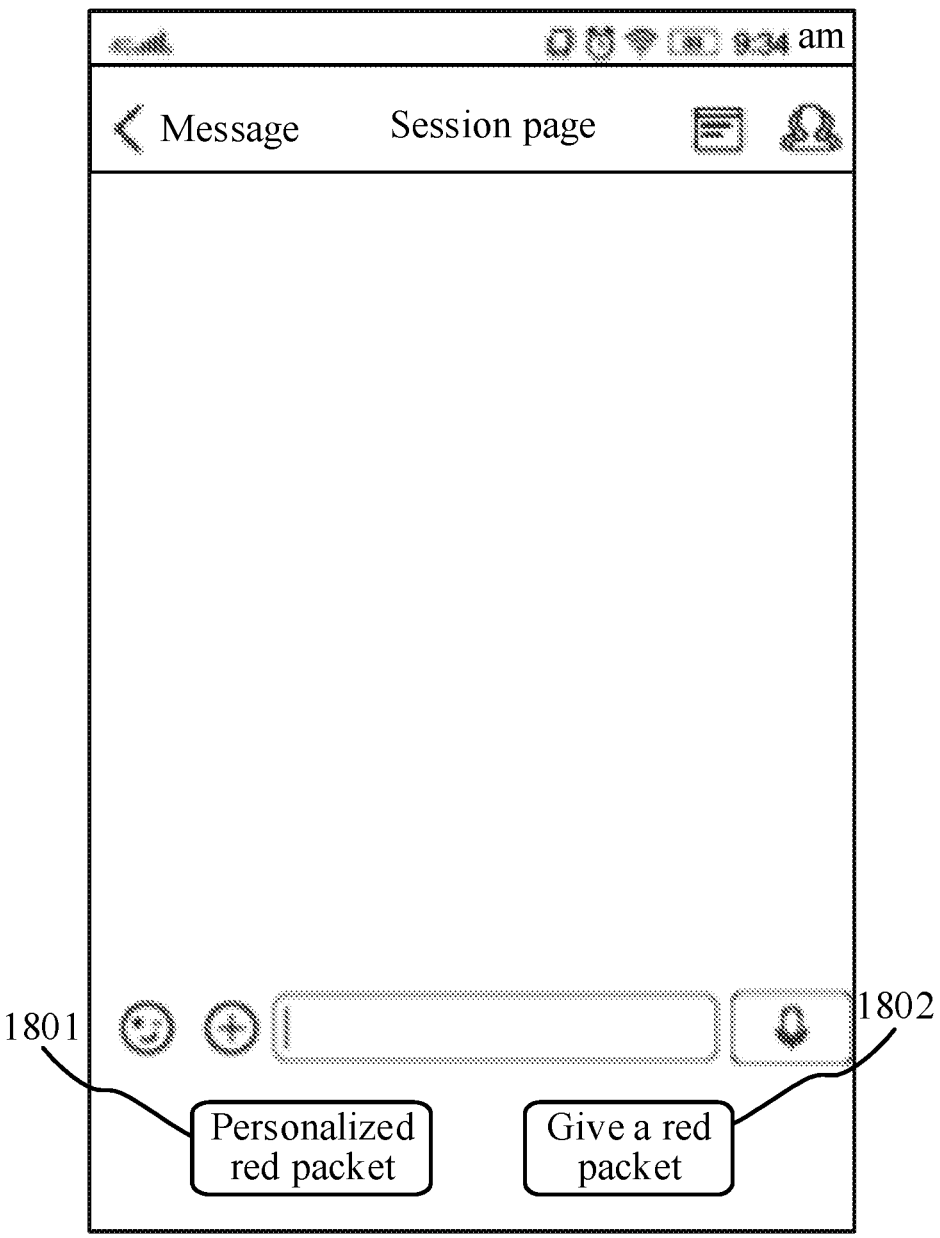
FIG. 18 is a schematic diagram 1 of a session page according to some embodiments of the present disclosure.
Figure 19:
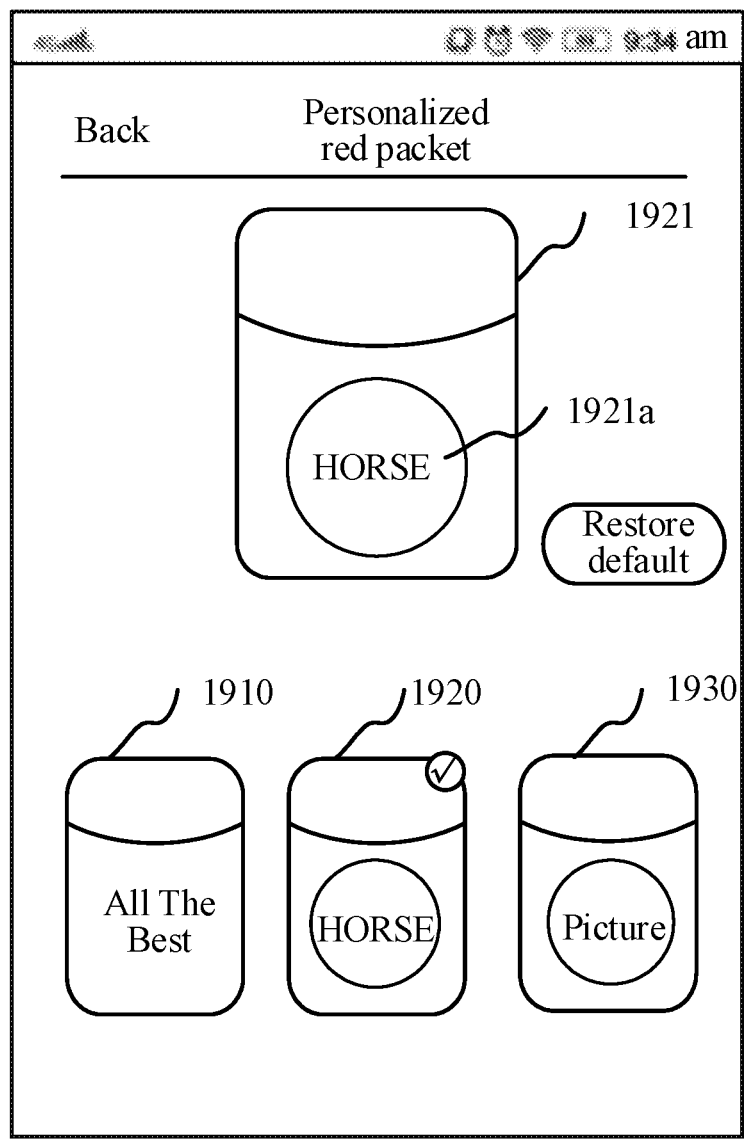
FIG. 19 is a schematic diagram 1 of a red packet image configuration page according to some embodiments of the present disclosure.

Referring to FIG. 18, after a user logs in to the social networking application, the user enters a session page, and taps a red packet image configuration control 1801 in a toolbar of the session page to enter the red packet image configuration page shown in FIG. 19.

Step 1704: Obtain candidate red packet image templates from a server, and select a red packet image template from the candidate red packet image templates.

For example, when entering the red packet image configuration page, the social networking application pulls a candidate red packet image template list from the server, and displays the candidate red packet image template list on the red packet image configuration page. The candidate red packet image templates 1910, 1920, and 1930 are shown in FIG. 19. In FIG. 19, the user selects the candidate red packet image template 1920, and displays an enlarged view of the candidate red packet image template 1920 on the social networking application.

Step 1706: Obtain a constraint condition corresponding to the selected red packet image template.

Figure 20:
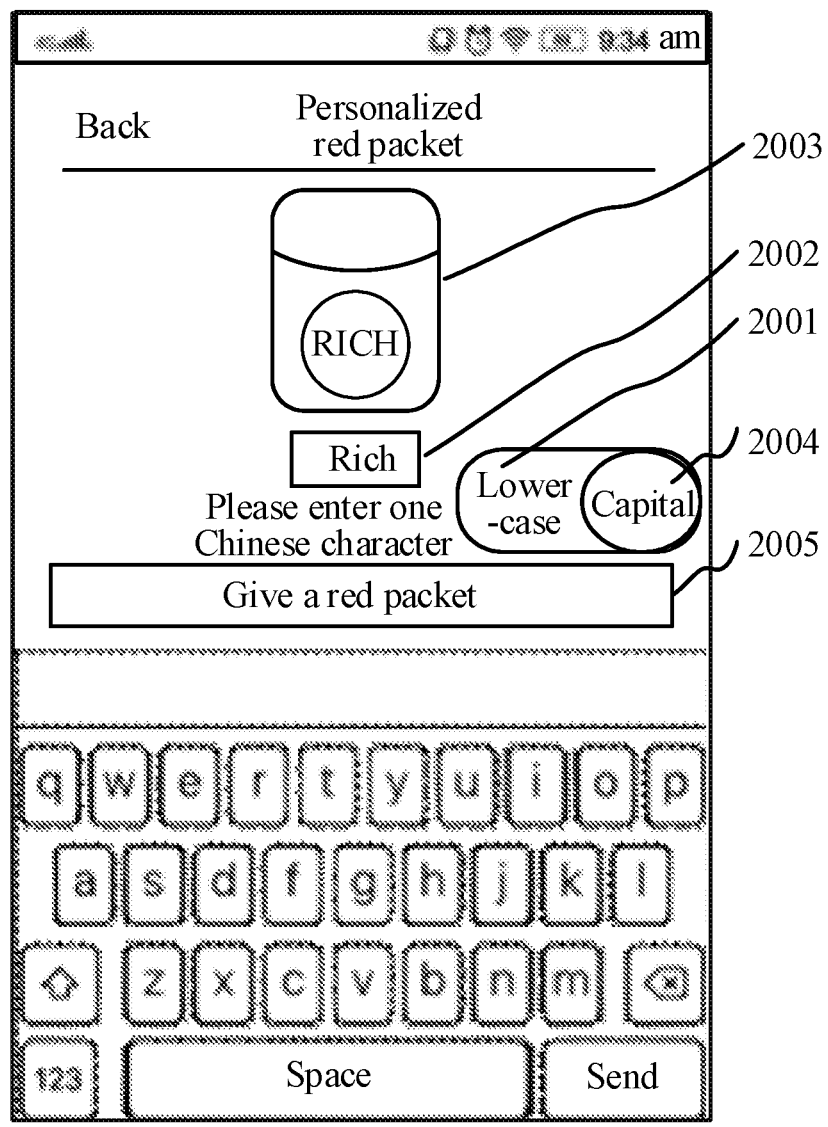
FIG. 20 is a schematic diagram 2 of a red packet image configuration page according to some embodiments of the present disclosure.

For example, the user taps an editing area 1921a of a red packet image template 1921 shown in FIG. 19, and enters a red packet image configuration page shown in FIG. 20. The social networking application obtains a constraint condition corresponding to the red packet image template 1921, and the constraint condition includes that the visible element is an English word.

Step 1708: Obtain a user-defined visible element under the constraint condition.

For example, referring to FIG. 20, a prompt 2001 of the constraint condition may be displayed on the social networking application. The user enters an English word "Rich" in an input box 2002, and a preview image 2003 of a red packet image that is generated after the English word "Rich" is added to the editing area of the selected red packet image template is displayed on the social networking application. The social networking application may provide a switch 2004 that may switch the visible element of the English word between capital letters and lower-case letters.

Figure 21:
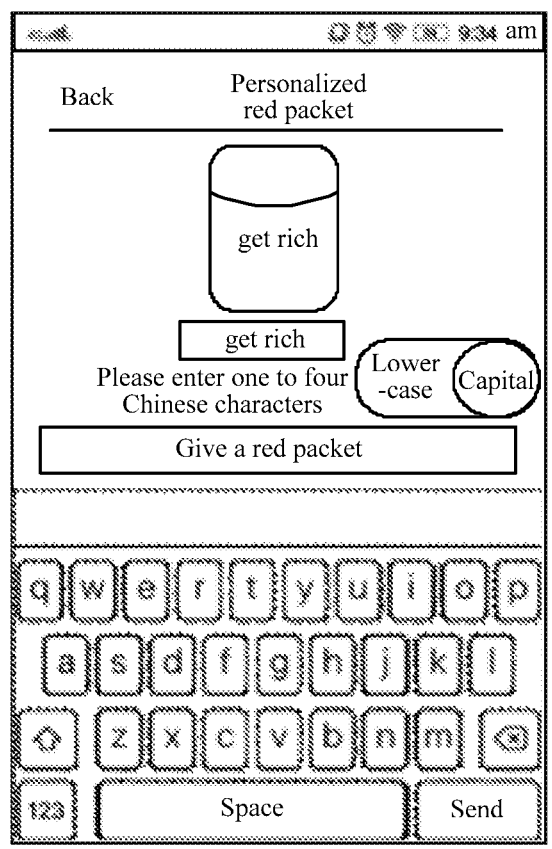
FIG. 21 is a schematic diagram 3 of a red packet image configuration page according to some embodiments of the present disclosure.
Figure 22:
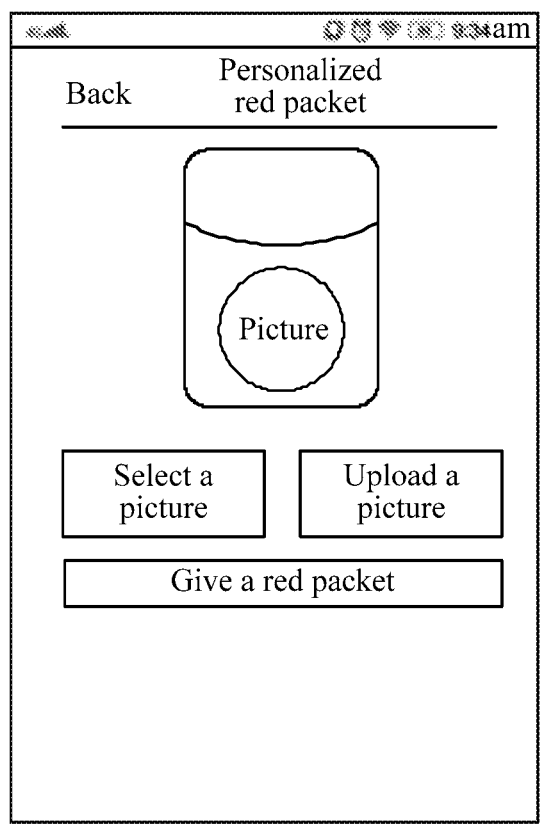
FIG. 22 is a schematic diagram 4 of a red packet image configuration page according to some embodiments of the present disclosure.

For another example, referring to FIG. 21, if the selected red packet image template is 1910, a corresponding constraint condition includes that the visible element is four English letters at most. The user may enter one to four English letters under the constraint condition, and the social networking application may adaptively adjust a word size of the English letters according to different quantities of the English letters. For another example, referring to FIG. 22, if the selected red packet image template is 1930, a corresponding constraint condition includes that the visible element is an image format, and the size of the visible elements does not exceed a preset value.

Step 1710: Obtain configuration information corresponding to the user-defined visible element.

Step 1712: Obtain a user identifier of a currently logged-in social networking application, and associate the selected red packet image template, the user-defined visible element, and the obtained configuration information with the user identifier on the server.

Step 1713: Configure a to-be-shared resource, to obtain data needed for obtaining a resource.

Step 1714: Query the server for the red packet image template, the user-defined visible element, and the configuration information of the visible element that are associated with the user identifier.

For example, when the user taps a virtual red packet trigger control 1802 on a session page shown in FIG. 18, the social networking application triggers to query the server for drawn data, or when the user taps a virtual red packet trigger control 2005 on the red packet image configuration page, the social networking application triggers to query the server for the drawn data.

Step 1716: Draw a red packet image according to the red packet image template, the visible element, and the configuration information.

Step 1718: Display the red packet image on a session page of the social networking application.

Step 1720: Transfer, by using a social network, a red packet message that corresponds to the red packet image and that includes data needed for allocating a value, where a resource sharing message includes the data needed for obtaining a resource.

Figure 23:
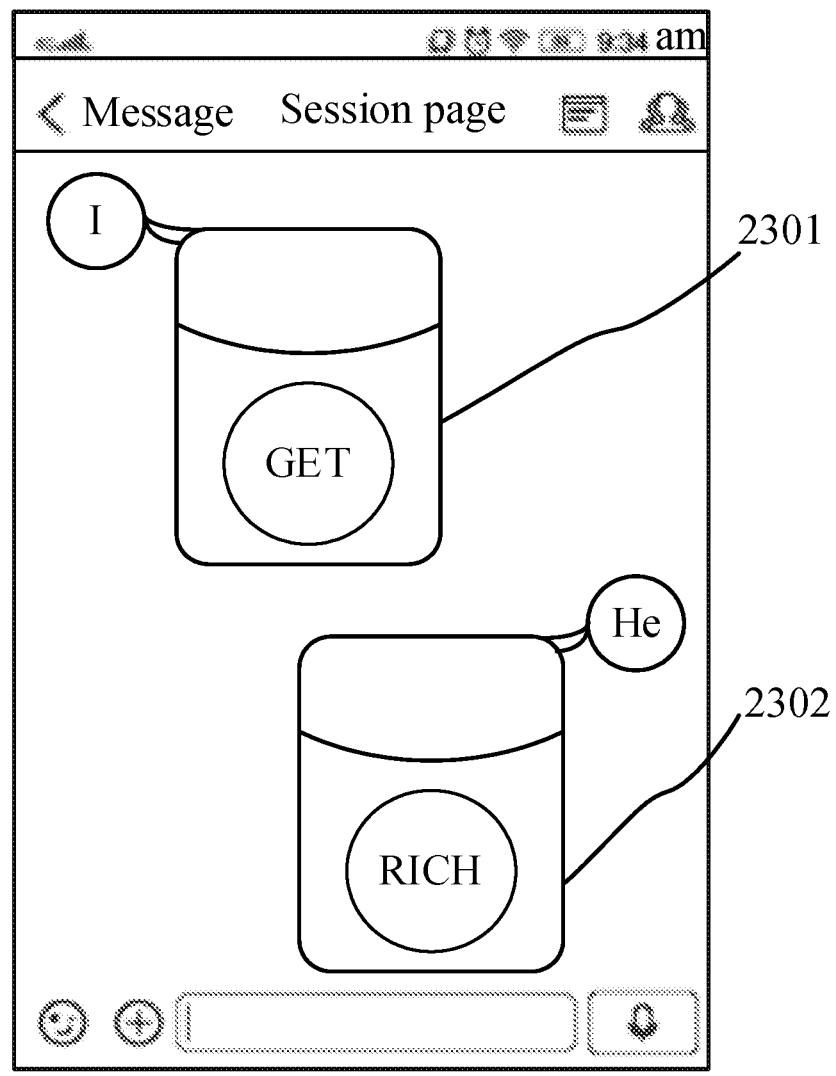
FIG. 23 is a schematic diagram 2 of a session page according to some embodiments of the present disclosure.

For example, referring to FIG. 23, when displaying the red packet message sent by the user, the social networking application displays a red packet image 2301 of the red packet message, and transfers the red packet message to a session object (one or more) on the session page by using the social network. The session object can also send the red packet message. For example, after receiving a red packet message sent by the session object, the terminal displays the red packet image 21402 of the red packet message.

Figure 24:
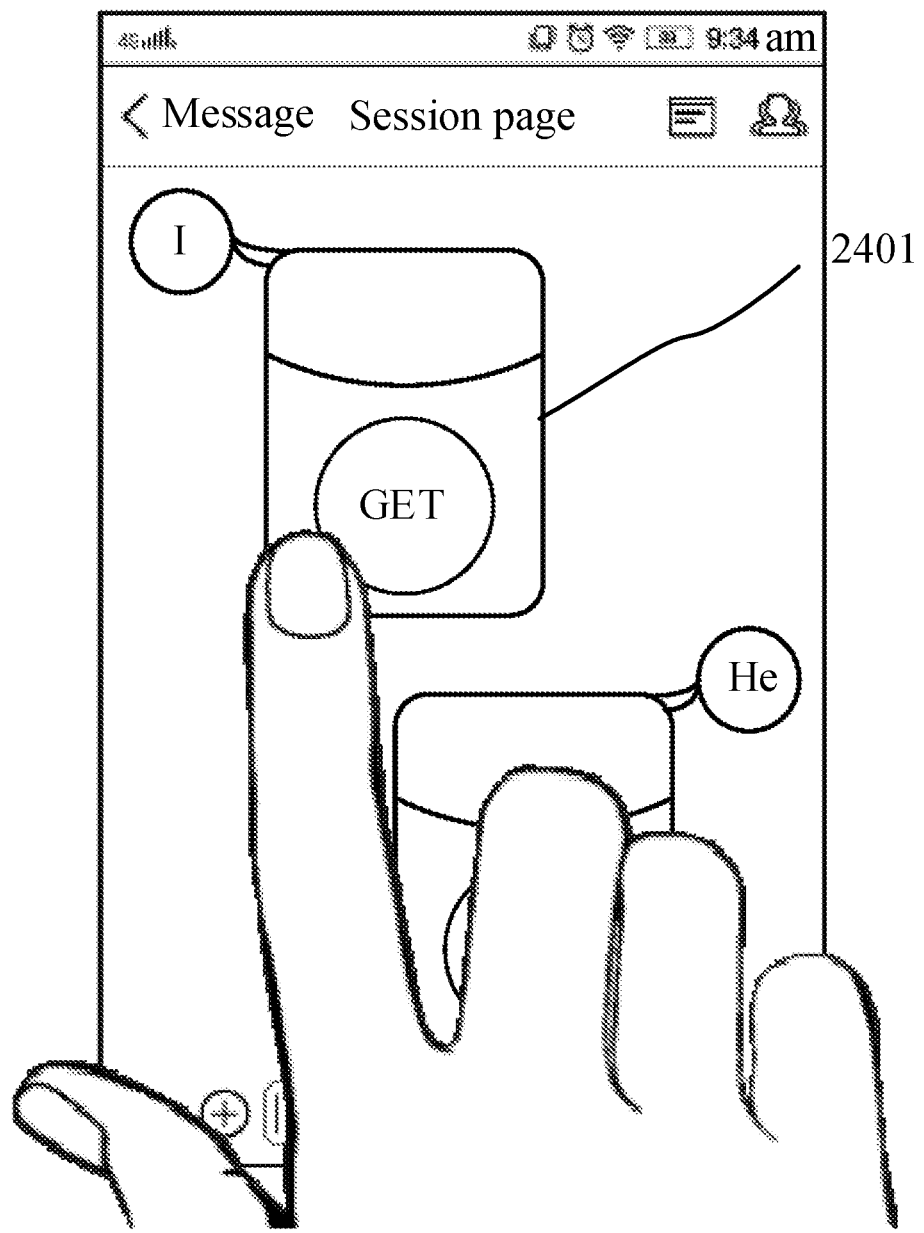
FIG. 24 is a schematic diagram 3 of a session page according to some embodiments of the present disclosure.

Step 1722: Obtain an operation instruction for the displayed red packet image. For example, referring to FIG. 24, the user can tap a red packet image 2401 to trigger the operation instruction.

Step 1724: Generate, according to the operation instruction, a value allocation request including a red packet identifier and a value requirement party identifier.

Step 1726: Send the value allocation request to the server, so that the server selects some or all values from a remaining value share corresponding to the red packet identifier, and allocates the some or all values to a value account corresponding to the value requirement party identifier.

Step 1728: Receive a value allocation result fed back by the server.

Step 1730: Display a result displaying page having a custom background image that matches the visible element, and display the value allocation result on the result displaying page.

Figure 25:
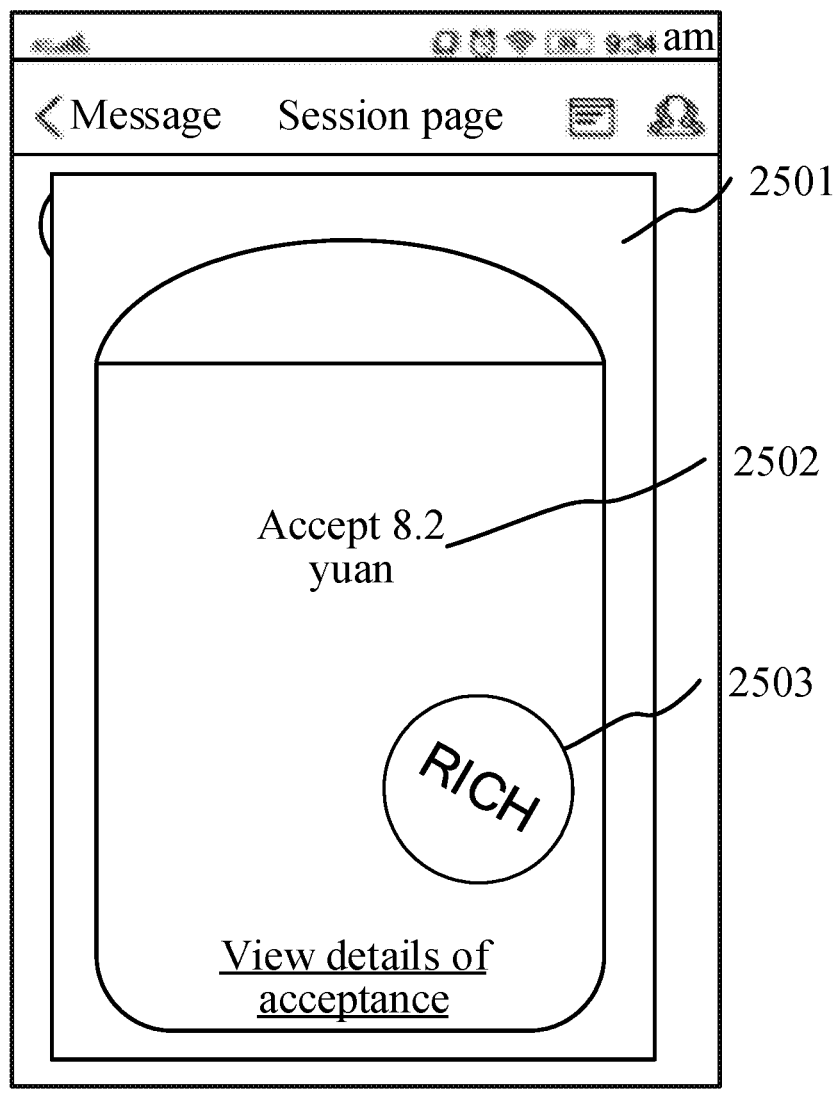
FIG. 25 is a schematic diagram 4 of a session page according to some embodiments of the present disclosure.

For example, referring to FIG. 25, the social networking application displays a result displaying page 2501 in a red packet format, and the result displaying page 2501 displays a value allocation result 21602, and a custom background image 2503 of the result displaying page 2501 matches the user-defined visible element.

In this embodiment, in the session page of the social networking application, a red packet message sent by each user may have desirable identifiability, and a particular red packet message can be efficiently identified in a multi-user session scenario. Moreover, the multiple users can interact with each other in the session page by mean of the red packet image, as shown in FIG. 23.

Figure 26:
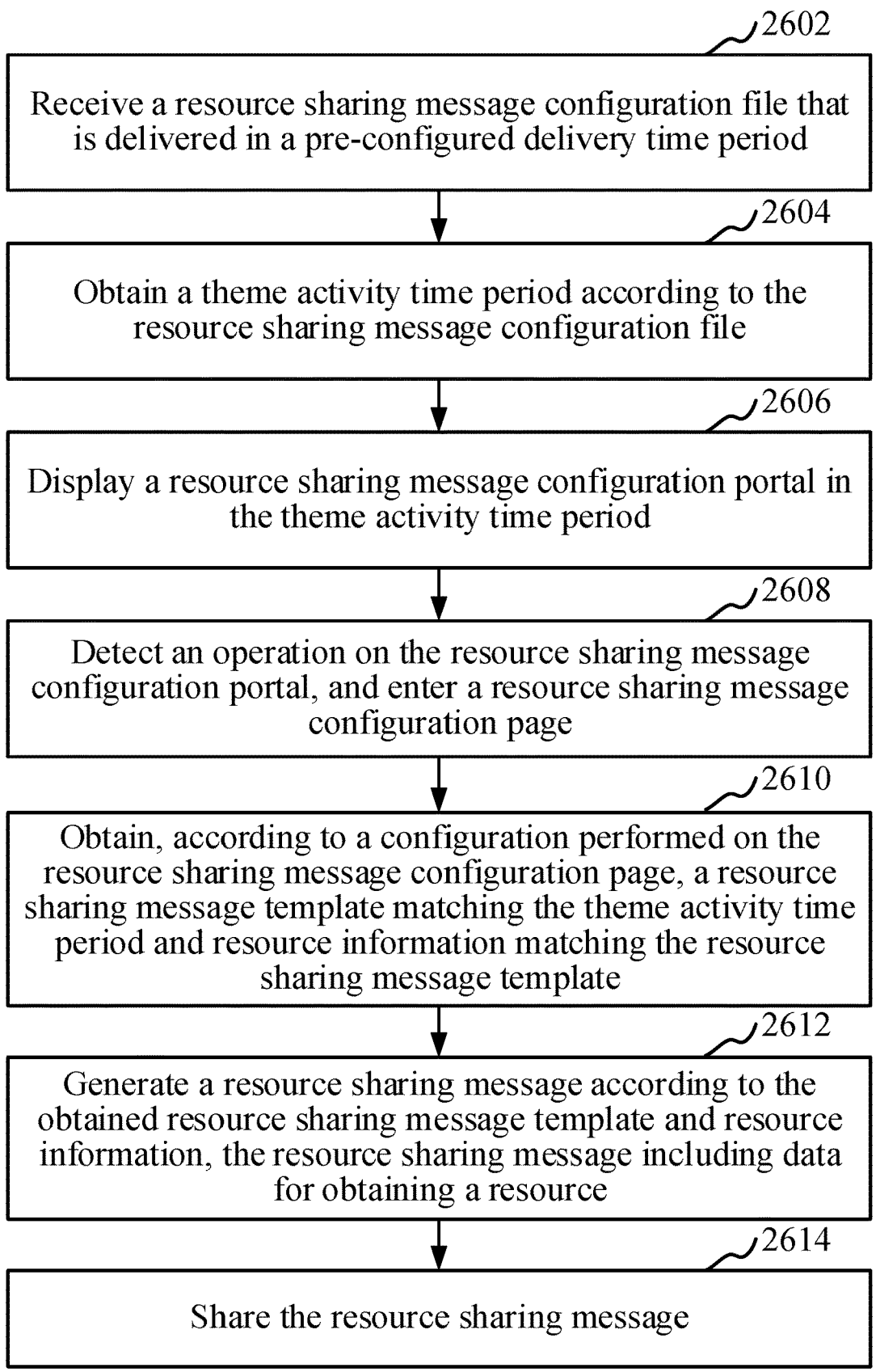
FIG. 26 is a schematic flowchart of a resource sharing method according to some embodiments of the present disclosure.

As shown in FIG. 26, in an embodiment, a resource sharing method is provided. This embodiment is described by using an example in which the method is applied to the first terminal 110 shown in FIG. 1. The method specifically includes following steps:

Step 2602. Receive a resource sharing message configuration file that is delivered in a pre-configured delivery time period.

Specifically, the resource sharing message configuration file is a file recording a configuration parameter that is used to generate a resource sharing message, and may include one of a theme name, a theme identifier, a theme activity start time, a theme activity end time, a link address of a resource sharing message image, a resource sharing message text, and a resource information, or a combination thereof. The theme identifier is different from the theme name.

A server may provide an operation configuration page, obtain a configuration parameter according to a configuration operation in a configuration item on the operation configuration page, generate the resource sharing message configuration file according to the configuration parameter, obtain the delivery time period, and deliver the resource sharing message configuration file in the configured delivery time period. The delivery time period may be represented by a delivery start time and a delivery end time.

The resource is an object whose ownership can be obtained by using a network and includes at least one of a virtual object and a physical object. The virtual object includes at least one of an account value, a virtual image product, a virtual prepaid card, game equipment, and virtual currency. The physical object may be an object that can be arbitrarily owned by the user and that has an actual form, and is for example, an electronic product, a toy, an artifact, and a signed photo.

Step 2604. Obtain a theme activity time period according to the resource sharing message configuration file.

Specifically, the theme activity time period is a time period of the resource sharing message that is generated by using the resource sharing method provided in this embodiment of this application and that has specified theme semantics. The theme activity time period may be represented by using the theme activity start time and the theme activity end time. The first terminal may directly read the theme activity time period from the resource sharing message configuration file, or may pull the theme activity time period from the server according to the link address in the resource sharing message configuration file.

Step 2606. Display a resource sharing message configuration portal in the theme activity time period.

Figure 27:
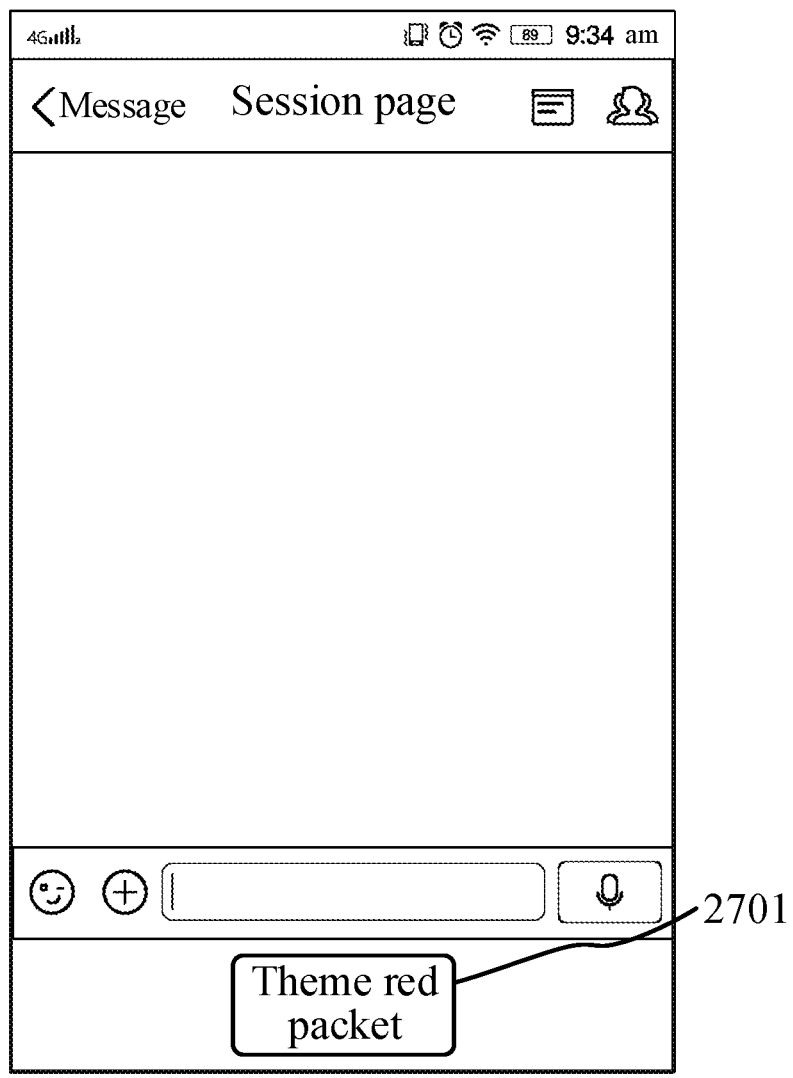
FIG. 27 is a schematic diagram of a session page according to some embodiments of the present disclosure.

Specifically, the first terminal may display the resource sharing message configuration portal when a current time is greater than or equal to the theme activity start time, and end display of the resource sharing message configuration portal when the current time is greater than the theme activity end time. The resource sharing message configuration portal is used to trigger to enter a resource sharing message configuration page, to complete necessary configurations on the resource sharing message. The resource sharing message configuration portal may be represented in a form of an icon, a hyperlink, or a button. For example, the first terminal may display a session toolbar in a session page shown in FIG. 27, and display a resource sharing message configuration portal 2701 in the session toolbar.

Step 2608. Detect an operation on the resource sharing message configuration portal, and enter a resource sharing message configuration page.

Specifically, the first terminal detects a pre-defined operation acting on the resource sharing message configuration portal, and enters the resource sharing message configuration page if detecting the pre-defined operation. The resource sharing message configuration page may be in a form of a floating layer or a window. The pre-defined operation is, for example, a one-tap operation, a double-tap operation, a slide-operation, or a multi-touch operation.

Step 2610. Obtain, according to a configuration performed on the resource sharing message configuration page, a resource sharing message template matching the theme activity time period and resource information matching the resource sharing message template.

Specifically, the resource sharing message configuration page may provide one or more configuration items for a user to perform configuration. After configuration is completed, a resource sharing message template having specified theme semantics and resource information having a mapping relationship with the resource sharing message template are obtained.

The resource sharing message template refers to information that needs to be displayed when the resource sharing message is displayed, and may include a resource sharing message image and a resource sharing message text. The resource sharing message image is an image displayed when the resource sharing message is displayed, and the resource sharing message text is a text, such as blessing words, displayed when the resource sharing message is displayed. The resource information is information about a resource that corresponds to the resource sharing message, and includes a resource share, such as a to-be-shared currency value; and the resource information may further include a resource type.

That the resource sharing message template has specified theme semantics means that the resource sharing message template conveys a specified theme idea in a form of images and/or words, so that a person may obtain the theme idea conveyed by the resource sharing message. The resource information has a mapping relationship with the resource sharing message template, so that the configuration on the to-be-shared resource can be rapidly completed, and the user does not need to enter the resource information character by character.

Figure 28:
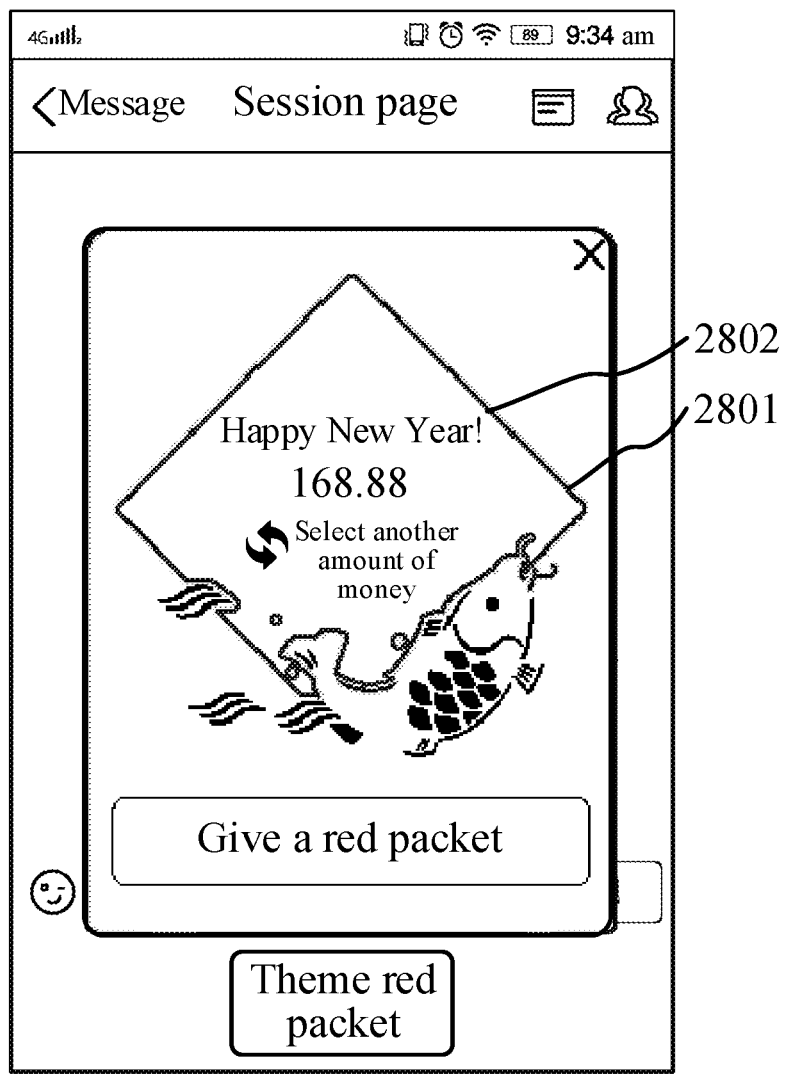
FIG. 28 shows a resource sharing message configuration page 1 according to some embodiments of the present disclosure.

For example, referring to FIG. 28, a resource sharing message template includes a resource sharing message image 2801 and a resource sharing message text 2802. The resource sharing message image 2801 includes an image of fish. In Chinese, a homophone of fish indicates a meaning of "remaining". Herein, fish is used to express the meaning of the homophone, and indicate a good wish that life is affluent and there are more wealth and food than necessary. This is a traditional theme idea for celebrating the Chinese Lunar New Year, and has theme semantics of expressing New Year's blessings. The resource sharing message text 2802 expresses the theme semantics of the New Year's blessings in words. The theme semantics expressed by the resource sharing message image 2801 is the same as that expressed by the resource sharing message text 2802.

Figure 29:
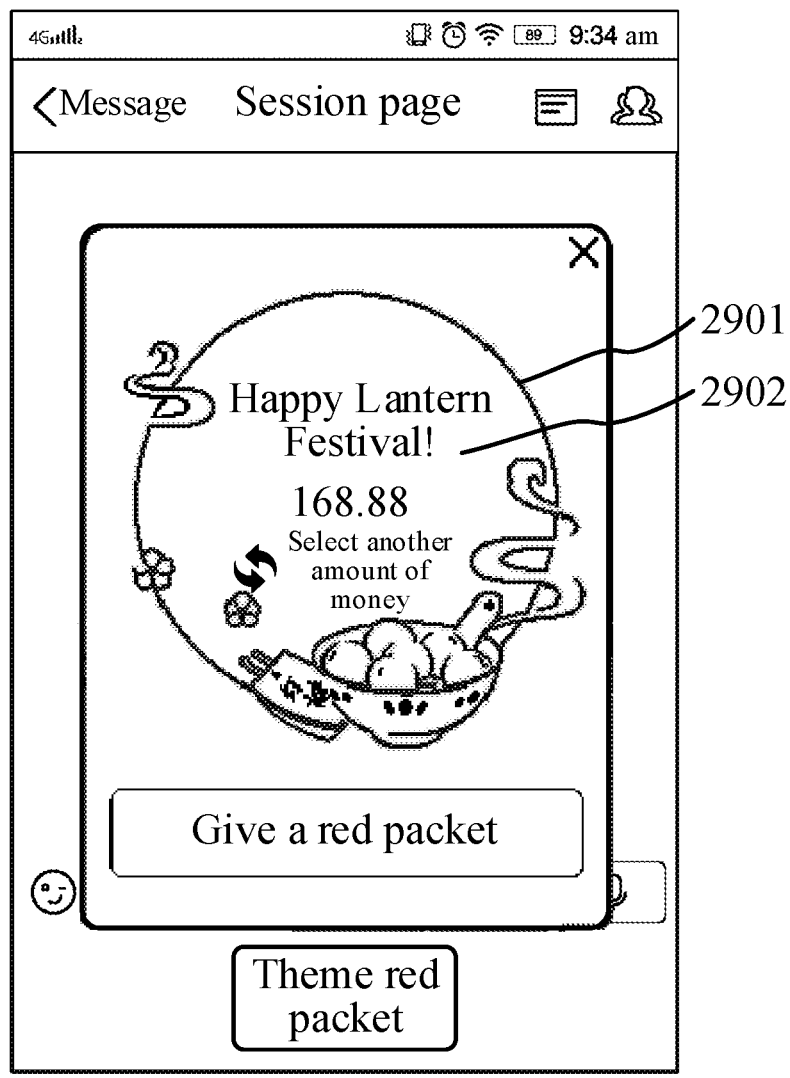
FIG. 29 shows a resource sharing message configuration page 2 according to some embodiments of the present disclosure.

Referring to FIG. 29, a resource sharing message template includes a resource sharing message image 2901 and a resource sharing message text 2902. The resource sharing message image 2901 expresses theme semantics of Lantern Festival blessings by means of food in a bowl in an image, and the resource sharing message text 2902 expresses theme semantics of Lantern Festival blessings in words. The Lantern Festival is a Chinese traditional festival, and falls on the fifteenth day of the Chinese Lunar New Year.

Figure 30:
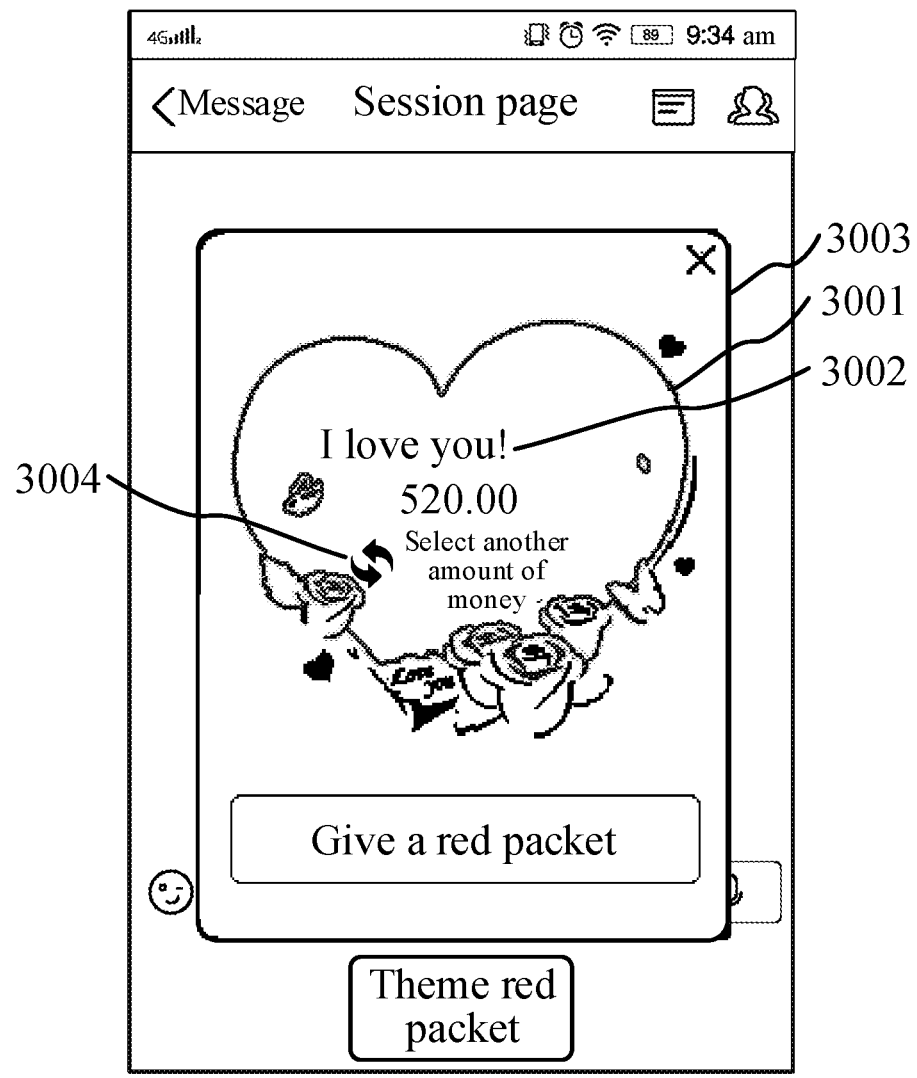
FIG. 30 shows a resource sharing message configuration page 3 according to some embodiments of the present disclosure.

Referring to FIG. 30, a resource sharing message template includes a resource sharing message image 3001 and a resource sharing message text 3002. The resource sharing message image 3001 expresses theme semantics of Valentine's Day blessings by means of heart shapes and roses that symbolizes love and that are in an image, and the resource sharing message text 3002 expresses theme semantics related to love in words.

Figure 31:
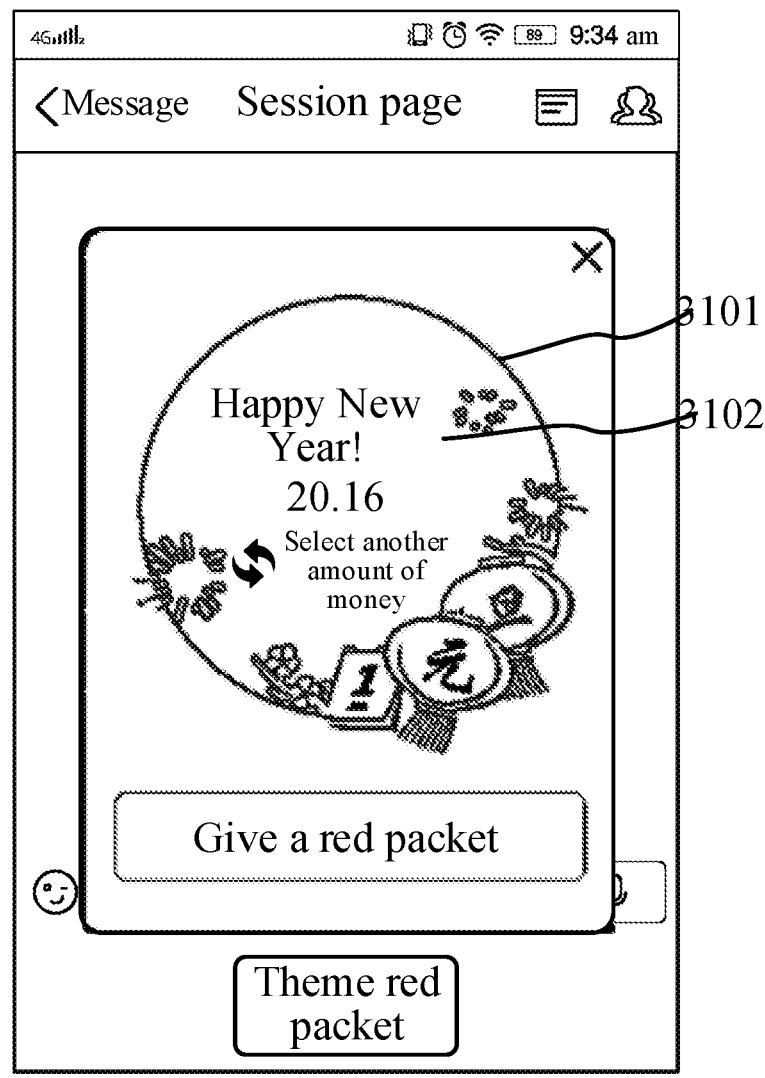
FIG. 31 shows a resource sharing message configuration page 4 according to some embodiments of the present disclosure.

Referring to FIG. 31, a resource sharing message template includes a resource sharing message image 3101 and a resource sharing message text 3102. The resource sharing message image 3101 expresses theme semantics of New Year blessings by means of a calendar and a lantern in an image, and the resource sharing message text 3102 expresses theme semantics of New Year blessings in words.

Step 2612. Generate a resource sharing message according to the obtained resource sharing message template and resource information, the resource sharing message including data for obtaining a resource.

The resource sharing message is used to trigger an action of obtaining a resource. The first terminal may generate the resource sharing message according to the obtained resource sharing message template and resource information, so that the generated resource sharing message has functions of obtaining a resource corresponding to the resource information and displaying the resource sharing message template.

Specifically, the generated resource sharing message may include the link address of the resource sharing message image, so that the first terminal may obtain and display the resource sharing message image according to the link address in the resource sharing message. The generated resource sharing message may include the resource sharing message text, so that the first terminal may display the resource sharing message text in the resource sharing message. The generated resource sharing message may further include the theme identifier, so that the first terminal may obtain and display a corresponding resource sharing message image and resource sharing message text according to the theme identifier. The generated resource sharing message may include the data for obtaining a resource, so that the first terminal may obtain a resource according to the data.

The data needed for obtaining a resource is data needed for obtaining a to-be-shared resource, and may include a resource identifier that is used to uniquely identify the to-be-shared resource; or may include a user identifier that is used to identify a user that initiates a resource sharing message; and may further include information about a validity period of the resource sharing message.

The first terminal may display the resource sharing message template on a social network propagation page of a social networking application. Specifically, the first terminal may draw and display the resource sharing message image on the social network propagation page, and display the resource sharing message text in a specified area of the resource sharing message image.

The social networking application is an application for network social networking and interaction based on a social network. The social networking application generally has a contact searching function and an instant messaging function, and may further have a user generated content (UGC) sharing function and a UGC commenting function. The social networking application may be an instant messaging application, a social network sites (SNS) application, or the like. The social network propagation page is a page, of the social networking application, that can be accessed by a social friend and that can propagate a message, and is for example, a session page, a UGC sharing page, or a personal page that can be accessed by the public. The session page includes a one-to-one session page and a group session page.

Step 2614. Share the resource sharing message.

Specifically, the first terminal may propagate the resource sharing message by using a social network. Specifically, the first terminal propagates the resource sharing message by using a message channel of a social network. A propagation object is related to the type of the social network propagation page when resource sharing is currently triggered. For example, if the social network propagation page is the one-to-one session page, the propagation object may be an identifier of another user who is in a session with a current user; or if the social network propagation page is the group session page, the propagation object may be all group members except the current user identifier in a current group.

According to the resource sharing method, the resource sharing message configuration file that is delivered in the pre-configured delivery time period is received, and the server can flexibly control the delivery time period of the resource sharing message configuration file that is used to generate the resource sharing message. The theme activity time period is obtained according to the resource sharing message configuration file, so that display of the resource sharing message configuration portal may be controlled by using the theme activity time period, and the resource sharing message generated in the theme activity time period may be accurately and flexibly controlled. The resource sharing message is generated according to the resource sharing message template matching the theme activity time period and the corresponding resource information. Therefore, the resource sharing message including the data for obtaining a resource is shared, and a message receiving party can obtain semantics that match the theme activity time period and that are sent by a resource sharing party while obtaining a resource by using the resource sharing message, so that more amount of useful information is conveyed.

In an embodiment, step 2602 specifically includes: receiving a resource sharing message configuration file that is delivered in the pre-configured delivery time period according to a corresponding delivery policy, wherein the delivery policy includes at least one of a delivery target user, a terminal operating system type, and a delivery target area.

Specifically, a server may provide an operation configuration page, obtain a configuration parameter according to a configuration operation in a configuration item on the operation configuration page, and generate the resource sharing message configuration file and a delivery policy according to the configuration parameter, so that the server delivers the resource sharing message configuration file to a first terminal according to the delivery policy. That the server delivers the resource sharing message configuration file according to the pre-configured delivery policy specifically means that the server delivers the resource sharing message configuration file in the delivery time period according to at least one of the delivery target user, the terminal operating system type, and the delivery target area.

The delivery policy includes at least one of the delivery target user, the terminal operating system type, and the delivery target area. The delivery target user may be represented in a target user identifier or a user attribute of a delivery target. The terminal operating system type is, for example, an iOS operating system or an Android operating system. The delivery target area may be a geographic area or an administratively divided area.

In this embodiment, by means of the pre-configured delivery policy, delivery of the resource sharing message configuration file by the server to the terminal may be flexibly controlled, and a user group for resource allocation can be freely selected by using the resource sharing method provided in this embodiment of this application.

Figure 32:
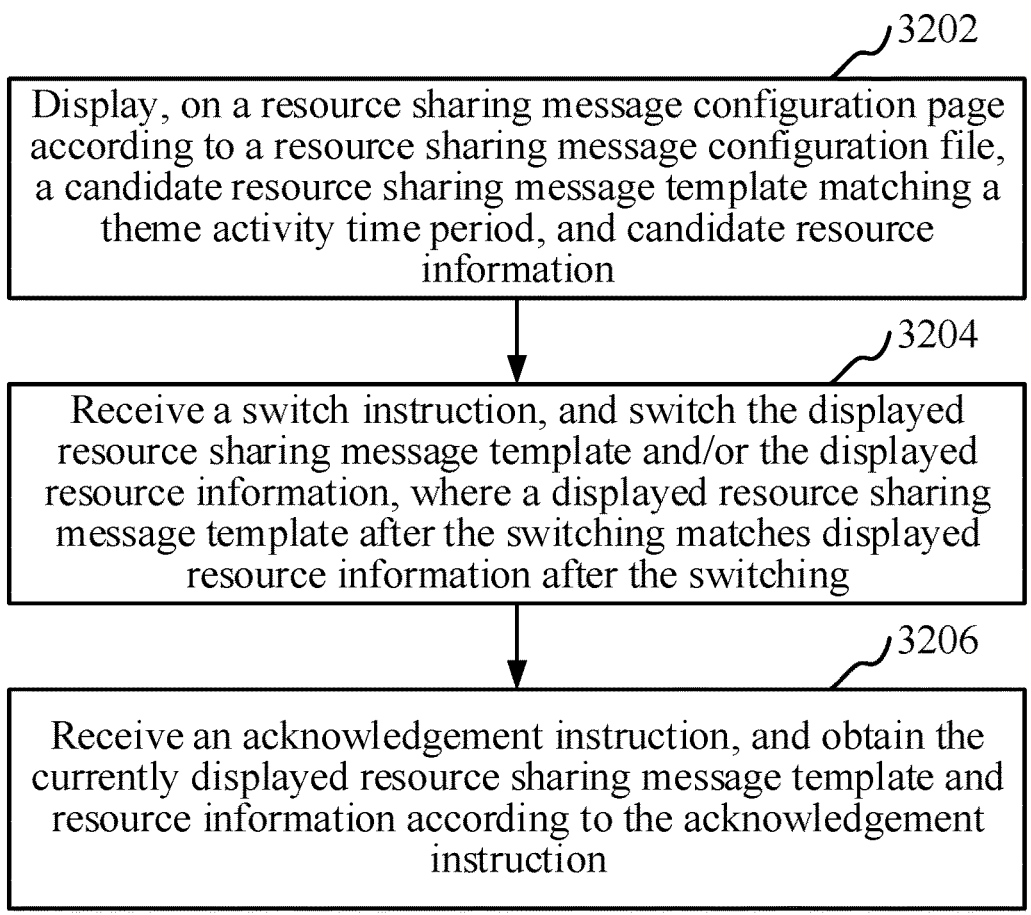
FIG. 32 shows obtaining, according to a configuration performed on the resource sharing message configuration page, a resource sharing message template matching the theme activity time period and resource information matching the resource sharing message template, according to some embodiments of the present disclosure.

As shown in FIG. 32, in an embodiment, step 2610 includes the following steps:

Step 3202. Display, on a resource sharing message configuration page according to a resource sharing message configuration file, a candidate resource sharing message template matching a theme activity time period, and candidate resource information.

Specifically, the first terminal obtains, according to the resource sharing message configuration file, and displays a candidate resource sharing message template having specified theme semantics, and obtains and displays candidate resource information matching the resource sharing message template. When the first terminal obtains, according to the resource sharing message configuration file, the candidate resource sharing message template having specified theme semantics, the first terminal may specifically download a resource sharing message image from a server according to an image link in the resource sharing message configuration file, or may directly read the resource sharing message image from the resource sharing message configuration file; and the first terminal may directly read a resource sharing message text from the resource sharing message configuration file. For example, referring to FIG. 30, the first terminal may display a resource sharing message image 3001 and a resource sharing message text 3002 on a resource sharing message configuration page 3003.

Step 3204. Receive a switch instruction, and switch the displayed resource sharing message template and/or the displayed resource information, where a displayed resource sharing message template after the switching matches displayed resource information after the switching.

Specifically, the first terminal may display a switch control that is configured to trigger the switch instruction, and trigger the switch instruction on detecting a pre-defined operation on the switch control. After the switch instruction is received, at least one of the displayed resource sharing message template and the displayed resource information is switched according to the switch instruction. In FIG. 28, a resource share switching manner is used. After the switching is performed, the displayed resource sharing message template still has the specified theme semantics, and the displayed resource information and the displayed resource sharing message template still have a mapping relationship. The displayed resource sharing message template and resource information are a set.

For example, referring to FIG. 30, the first terminal displays a switch control 3004, a user taps the switch control 3004 to trigger a switch instruction, and the first terminal switches, according to the switch instruction, to another resource share, such as to a resource share that has the same specified semantics as "1314" or "52.00" has. In Chinese, "1314" pronounces similarly to an idiom expressing a lifetime and is used to express a good wish of the lifetime love; and in Chinese, "520" pronounces similarly to "I love you" and is used by lovers to express love.

Step 3206. Receive an acknowledgement instruction, and obtain the currently displayed resource sharing message template and resource information according to the acknowledgement instruction.

Specifically, the first terminal may display a confirm control configured to trigger an acknowledgement instruction, trigger the acknowledgement instruction after detecting a pre-defined operation on the confirm control, and obtain the currently displayed resource sharing message template and the currently displayed resource information according to the touch control instruction. The obtained resource sharing message template and resource information are used to generate a resource sharing message.

In this embodiment, a candidate resource sharing message template that has specified theme semantics and candidate resource information matching the candidate resource sharing message template are provided, switching is performed according to a switch instruction, and a finally selected resource sharing message template and finally selected resource information are confirmed according to the acknowledgement instruction. A user may be favored, to some extent, with a capability of making a choice as he wishes and the user does not need to perform more operations, and variety of the resource sharing message and convenience of operations may be also considered.

Figure 33:
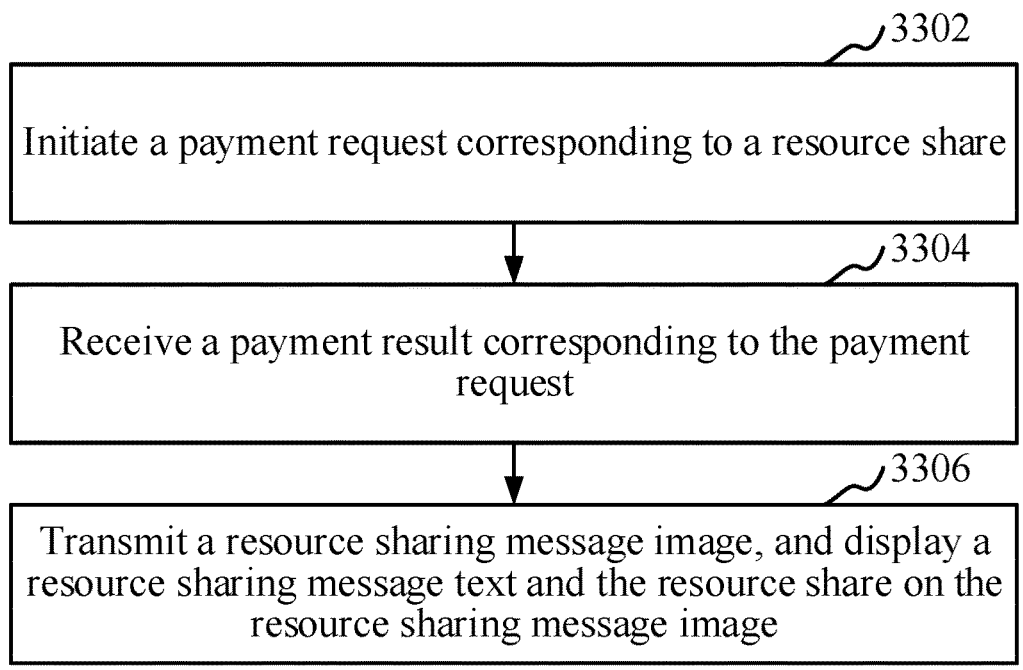
FIG. 33 is a schematic flowchart of steps of obtaining a resource share by means of payment according to some embodiments of the present disclosure.

In an embodiment, the resource sharing message template includes a resource sharing message image and a resource sharing message text, and the resource information includes a resource share. The method further includes steps of obtaining the resource share by means of payment. Referring to FIG. 33, the method specifically includes the following steps:

Step 3302. Initiate a payment request corresponding to a resource share.

Step 3304. Receive a payment result corresponding to the payment request.

Figure 34:
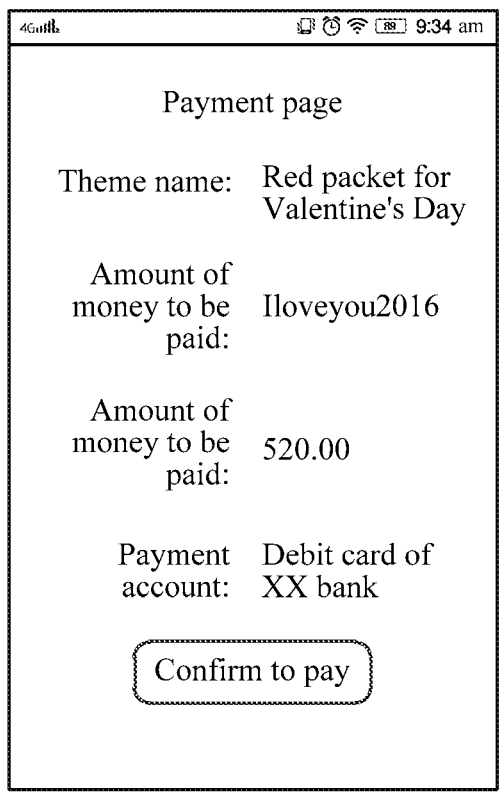
FIG. 34 is a schematic diagram of a payment page according to some embodiments of the present disclosure.

The first terminal may enter a payment page shown in FIG. 34, and obtain data needed for payment, so as to generate the payment request according to the data needed for payment, and send the payment request to a server or a third-party payment platform. The server or the third-party payment platform processes the payment request, and returns a payment result to the first terminal.

Specifically, the first terminal may obtain a payer account identifier and a payment amount corresponding to a resource share, generate a payment request carrying the payer account identifier and the payment amount, and send the payment request to the server or the third-party payment platform. The server or the third-party payment platform deducts, according to the payment request, the payment amount from a payment account corresponding to the payer account identifier, adds the payment amount to a pre-configured recipient account to complete payment, and returns, to the first terminal, a result indicating that the payment is successful.

Step 3306. Transmit a resource sharing message image, and display a resource sharing message text and the resource share on the resource sharing message image.

Specifically, after receiving the result indicating that the payment is successful, the first terminal transmits the resource sharing message image, and may specifically transmit the resource sharing message image to the second terminal by using the server. The first terminal and the second terminal may display the resource sharing message text and the resource share in a specified area of the resource sharing message image, and the first terminal still performs step 2612. After receiving a result indicating that the payment fails, the first terminal prompts the user that the payment fails, and guides the user to re-perform the payment.

In this embodiment, the payment request is initiated, the resource sharing message image, the resource sharing message text, and the resource share are displayed on the social network propagation page after the result indicating that the payment succeeds is received, and a display effect of the resource sharing message on a message receiving end may be visually displayed.

Figure 35:
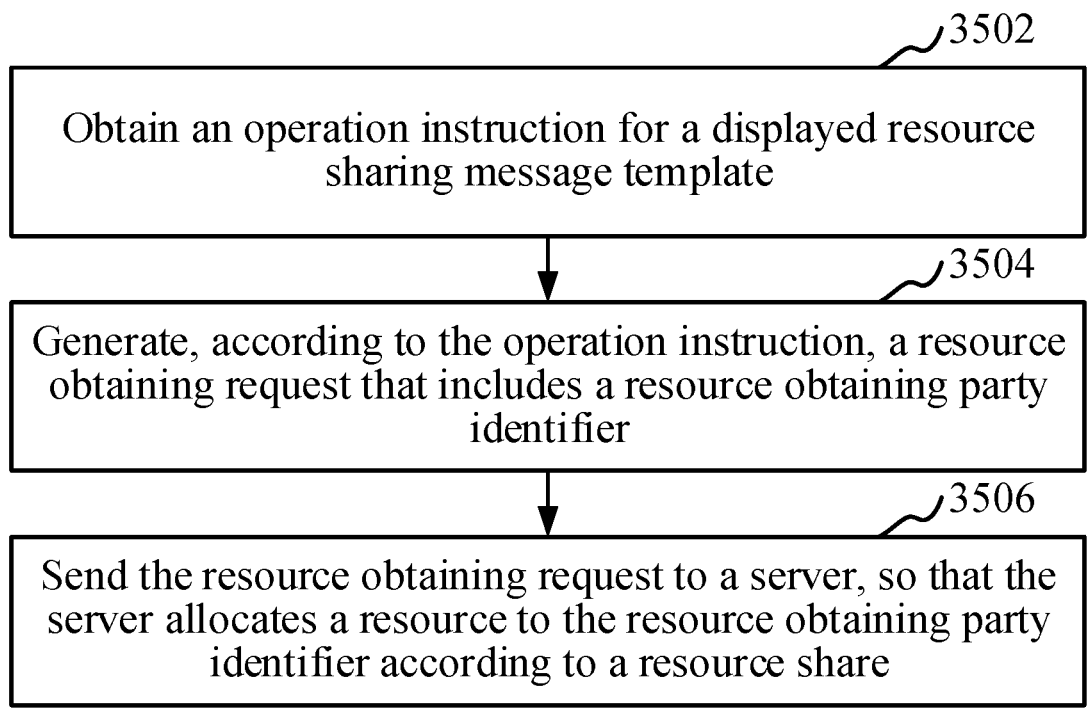
FIG. 35 is a schematic flowchart of steps of obtaining a resource according to some embodiments of the present disclosure.

As shown in FIG. 35, in an embodiment, the resource sharing method further includes steps of obtaining a resource, and specifically includes the following steps:

Step 3502: Obtain an operation instruction for the displayed resource sharing message image.

Specifically, the first terminal detects a pre-defined operation on the displayed resource sharing message image, and triggers a corresponding operation instruction if detecting the pre-defined operation.

Step 3504. Generate, according to the operation instruction, a resource obtaining request that includes a resource obtaining party identifier.

Specifically, after obtaining the operation instruction, the first terminal may obtain a user identifier that currently logs in to a social networking application, as the resource obtaining party identifier, and obtain data, such as a resource identifier, that is used for obtaining a resource and that is in the resource sharing message, so as to generate the resource obtaining request carrying the resource obtaining party identifier. The resource obtaining party identifier is a unique identifier of a party requesting for obtaining a resource.

Step 3506. Send the resource obtaining request to a server, so that the server allocates a resource to the resource obtaining party identifier according to the resource share.

Specifically, the first terminal sends the resource obtaining request to the server, and the server obtains the resource identifier and the resource obtaining party identifier according to the resource obtaining request, so as to allocate, to the resource obtaining party identifier, the resource corresponding to the resource identifier. After receiving the resource obtaining request, the server determines whether there is a remaining share in the resource corresponding to the resource identifier, and if there is the remaining share, allocates, to the resource obtaining party identifier, a resource from the remaining resource, decreases a corresponding share, and feeds back, to the first terminal, a resource obtaining result indicating that the resource is successfully obtained; or if there is no remaining share, directly feeds back, to the first terminal, a resource obtaining result indicating that the resource is not successfully obtained.

When the server allocates a resource, if the resource is a resource that is to be allocated as per a value, such as a virtual red packet or a value of a prepaid card, when the server allocates a resource to the resource obtaining party identifier, the server may select a value from a preset value range randomly or according to a preset fixed value, and transfer the value into a value account corresponding to the resource obtaining party identifier. The value account includes a cash account or a voucher account, and the value account may be set on a bank server or a third-party payment server. If the resource is a resource that can be obtained after registration, such as a physical object, when the server allocates the resource to the resource obtaining party identifier, the server may record a correspondence between the resource and the resource obtaining party identifier to represent a ownership of a corresponding user on the resource, so that the resource is subsequently provisioned in other forms.

Figure 36:
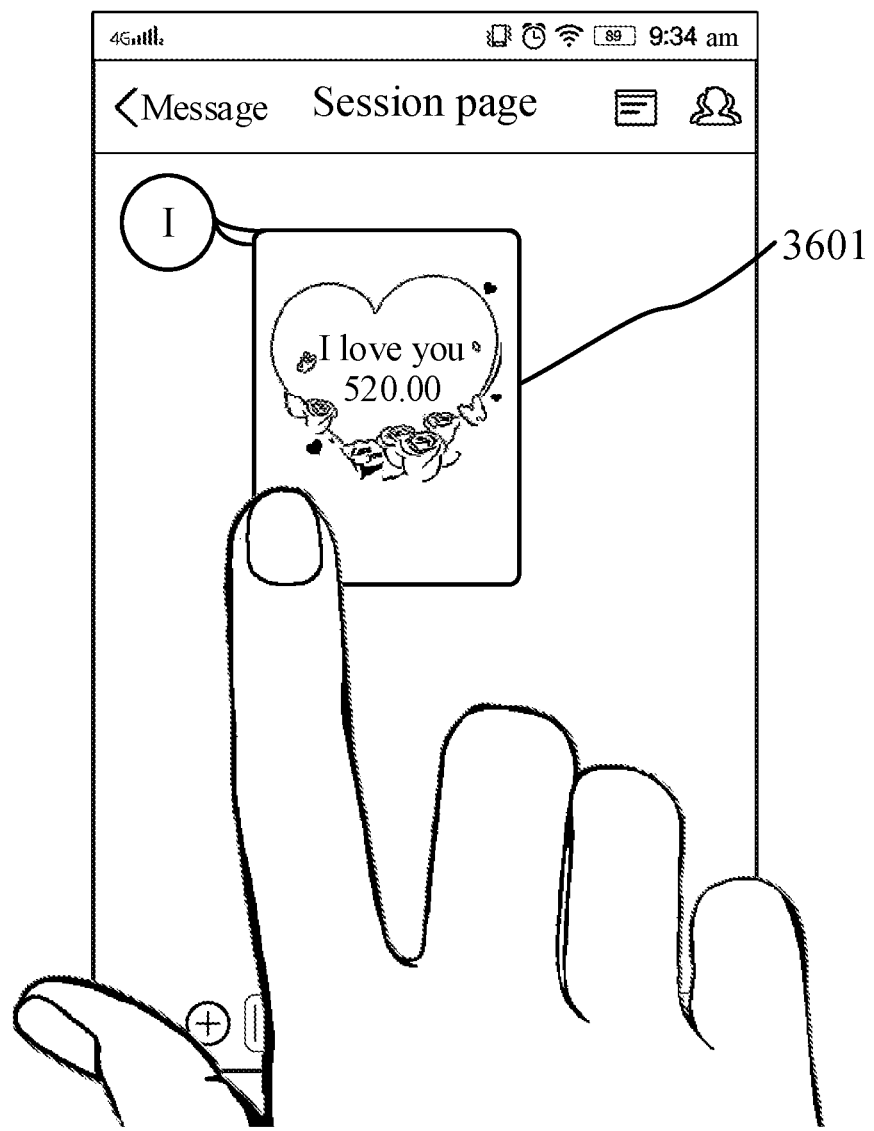
FIG. 36 is a schematic diagram of displaying a resource sharing message image on a session page according to some embodiments of the present disclosure.
Figure 37:
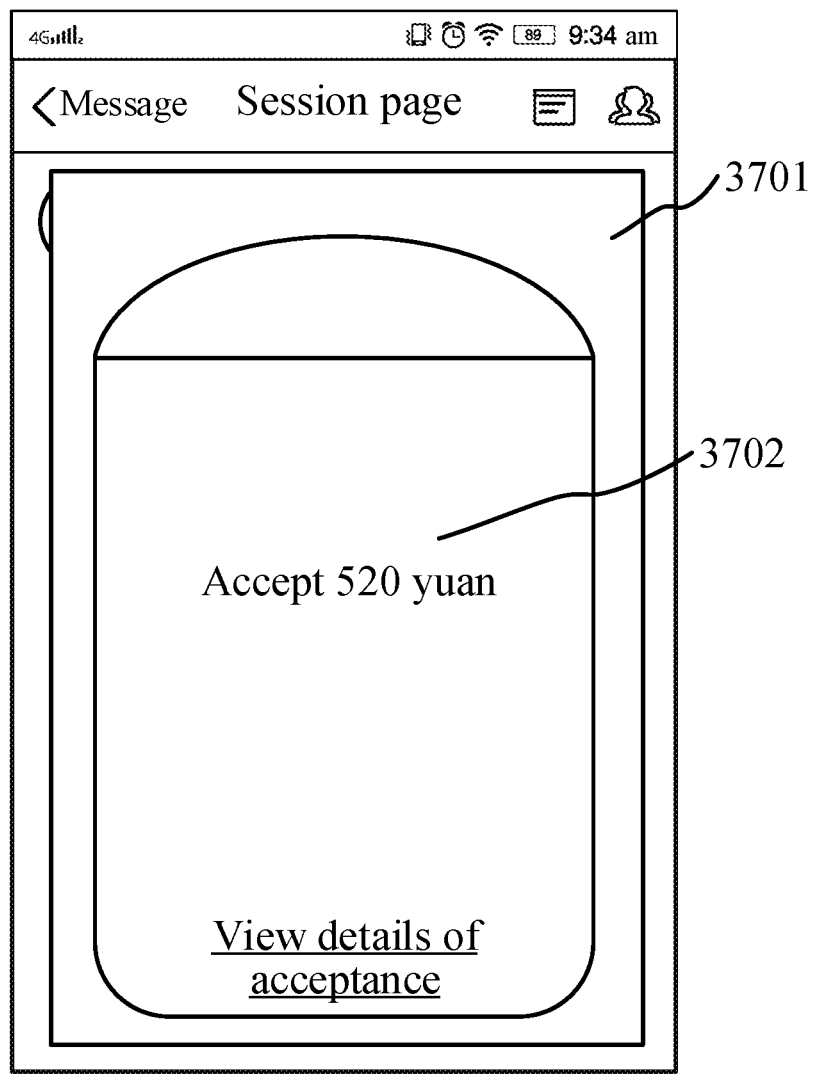
FIG. 37 is a schematic diagram of displaying a resource obtaining result on a result display page according to some embodiments of the present disclosure.

For example, referring to FIG. 36, a first terminal may display a resource sharing message image 32801 on a session page, and a user may trigger an operation instruction by tapping the resource sharing message image 32801, so as to trigger a resource obtaining request and send the resource obtaining request to a server. The server obtains a resource according to the resource obtaining request. After receiving a resource obtaining result fed back by the server, the first terminal may display a result display page 32901 shown in FIG. 37, and display a resource obtaining result 32902 on the result display page.

In this embodiment, by means of the operation instruction for the resource sharing message image, an action of obtaining a resource may be triggered and completed, so that the resource is conveniently shared.

Figure 38:
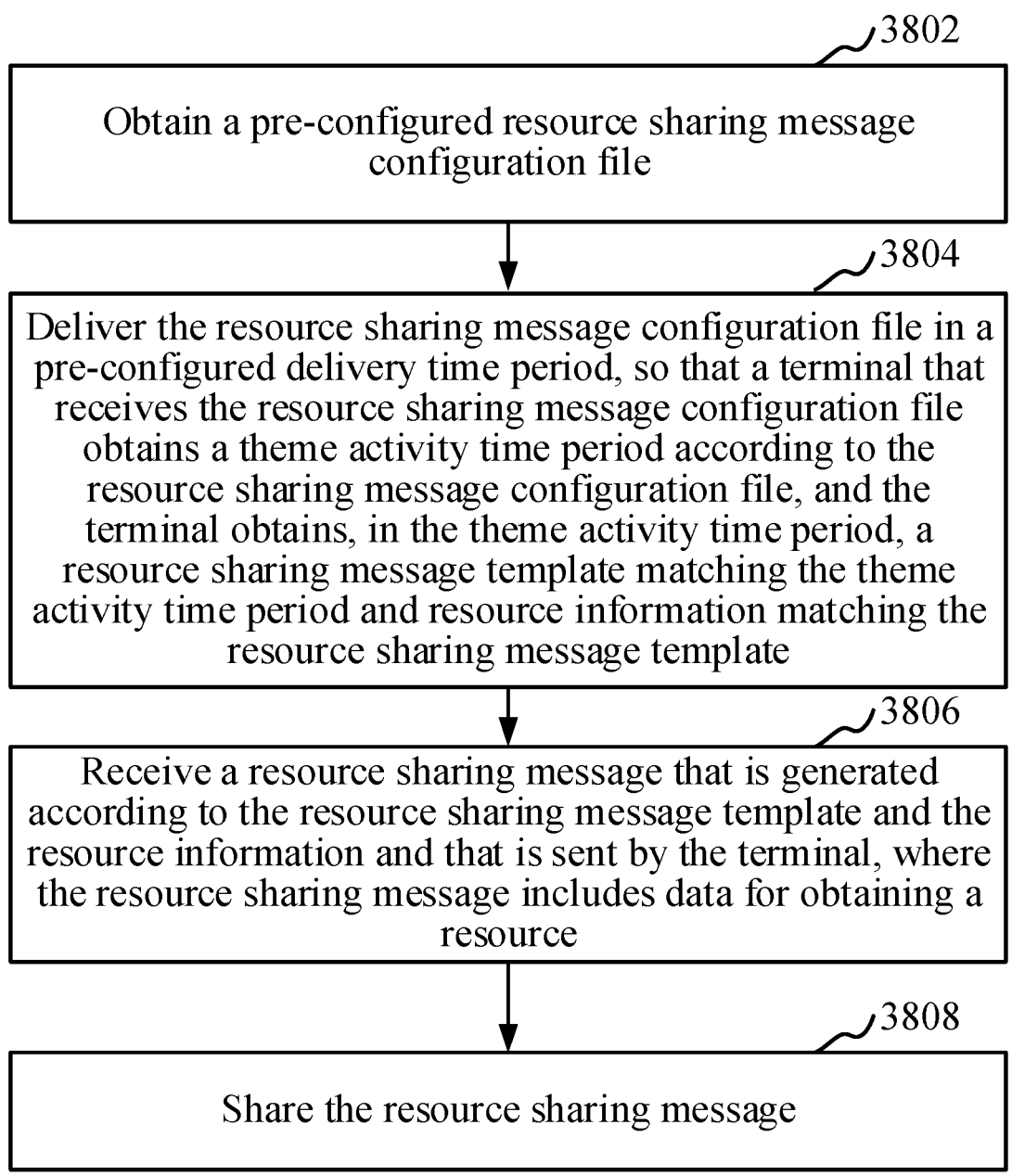
FIG. 38 is a schematic flowchart of a resource sharing method according to another embodiment.

As shown in FIG. 38, in an embodiment, another resource sharing method is provided. This embodiment is described by using an example in which the method is applied to the server 120 in FIG. 1. A terminal that receives a resource sharing message configuration file in this embodiment is the first terminal 110 in the foregoing the embodiments, and this embodiment may further include various steps performed by the first terminal in the resource sharing method of the foregoing various embodiments. The resource sharing method of this embodiment specifically includes the following steps:

Step 33002. Obtain a pre-configured resource sharing message configuration file.

Step 33004. Deliver the resource sharing message configuration file in a pre-configured delivery time period, so that a terminal that receives the resource sharing message configuration file obtains a theme activity time period according to the resource sharing message configuration file, and the terminal obtains, in the theme activity time period, a resource sharing message template matching the theme activity time period and resource information matching the resource sharing message template.

Step 3806. Receive a resource sharing message that is generated according to the resource sharing message template and the resource information and that is sent by the terminal, wherein the resource sharing message includes data for obtaining a resource.

Step 3808. Share the resource sharing message.

In an embodiment, the step of delivering the resource sharing message configuration file in a pre-configured delivery time period includes: delivering the resource sharing message configuration file in the pre-configured delivery time period according to a corresponding delivery policy, wherein the delivery policy includes at least one of a delivery target user, a terminal operating system type, and a delivery target area.

In an embodiment, the resource sharing message template includes a resource sharing message image and a resource sharing message text, and the resource information includes a resource share; and the resource sharing method further includes: receiving a payment request that is initiated by the terminal and that corresponds to the resource share; and performing a payment operation according to the payment request, and feeding back a payment result to the terminal, so that the terminal transmits the resource sharing message image, and displays the resource sharing message text and the resource share in the resource sharing message image.

In an embodiment, the resource sharing method further includes: receiving a resource obtaining request that includes a resource obtaining party identifier and that is triggered after the terminal performs an operation on the displayed resource sharing message image; and allocating a resource to the resource obtaining party identifier according to the resource share.

According to the resource sharing method, the resource sharing message configuration file is delivered in the pre-configured delivery time period, and the delivery time period of the resource sharing message configuration file that is used to generate the resource sharing message can be flexibly controlled. The terminal obtains the theme activity time period according to the resource sharing message configuration file, so as to control, by using the theme activity time period, the resource sharing message that is generated in theme activity time period. The resource sharing message is generated according to the resource sharing message template matching the theme activity time period and the corresponding resource information. Therefore, the resource sharing message including the data for obtaining a resource is shared, and a message receiving party can obtain a resource by using the resource sharing message and obtain semantics that match the theme activity time period and that are sent by a resource sharing party, so that more amount of useful information is conveyed.

Figure 39:
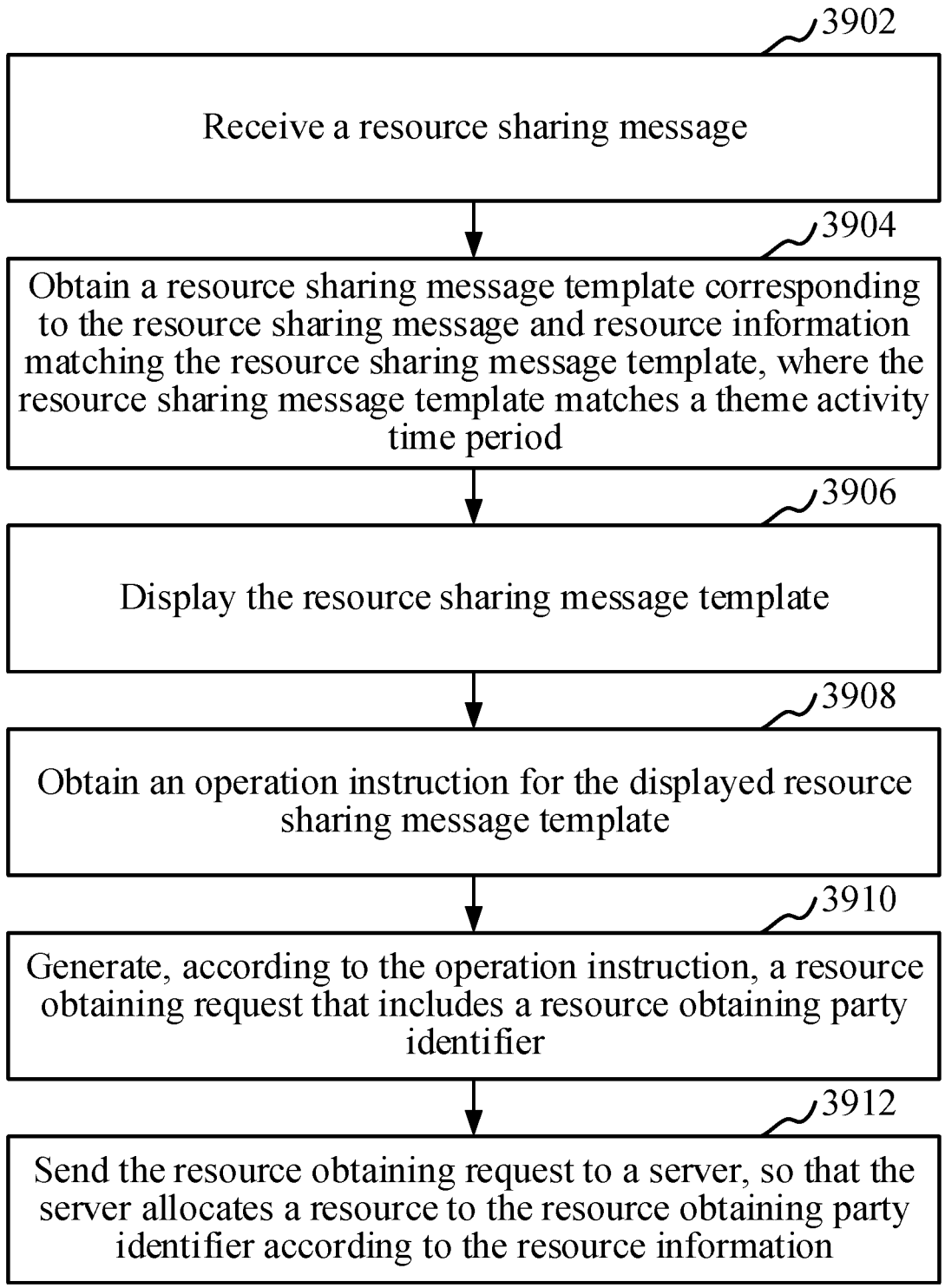
FIG. 39 is a schematic flowchart of a resource obtaining method according to an embodiment.

As shown in FIG. 39, in an embodiment, a resource obtaining method is provided. This embodiment is described by using an example in which the method is applied to the second terminal 110 shown in FIG. 1. The method specifically includes following steps:

Step 33102: Receive a resource sharing message. Specifically, the second terminal receives the resource sharing message that is generated and shared by the first terminal after the first terminal performs the resource sharing method.

Step 3904. Obtain a resource sharing message template corresponding to the resource sharing message and resource information matching the resource sharing message template, where the resource sharing message template matches a theme activity time period.

Specifically, the resource sharing message template refers to information that needs to be displayed when the resource sharing message is displayed, and may include a resource sharing message image and a resource sharing message text. The resource sharing message image is an image displayed when the resource sharing message is displayed, and the resource sharing message text is a text, such as blessing words, displayed when the resource sharing message is displayed. The resource information is information about a resource that corresponds to the resource sharing message, and includes a resource share, such as a to-be-shared currency value; and the resource information may further include a resource type.

The resource is an object whose ownership can be obtained by using a network and includes at least one of a virtual object and a physical object. The virtual object includes at least one of an account value, a virtual image product, a virtual prepaid card, game equipment, and virtual currency. The physical object may be an object that can be arbitrarily owned by the user and that has an actual form, and is for example, an electronic product, a toy, an artifact, and a signed photo.

That the resource sharing message template has specified theme semantics means that the resource sharing message template conveys a specified theme idea in a form of images and/or words, so that a person may obtain the theme idea conveyed by the resource sharing message. The resource information has a mapping relationship with the resource sharing message template, so that the configuration on the to-be-shared resource may be rapidly completed, and the user does not need to enter the resource information character by character.

Step 3906. Display the resource sharing message template.

Specifically, the second terminal may transmit a resource sharing message image, and display a resource sharing message text and the resource share on the resource sharing message image.

Step 3908. Obtain an operation instruction for the displayed resource sharing message template.

Specifically, the second terminal detects a pre-defined operation on the displayed resource sharing message image, and triggers a corresponding operation instruction if detecting the pre-defined operation.

Step 3910. Generate, according to the operation instruction, a resource obtaining request that includes a resource obtaining party identifier.

Specifically, after obtaining the operation instruction, the second terminal may obtain a user identifier that currently logs in to a social networking application, as the resource obtaining party identifier, and obtain data, such as a resource identifier, that is used for obtaining a resource and that is in the resource sharing message, so as to generate the resource obtaining request carrying the resource obtaining party identifier. The resource obtaining party identifier is a unique identifier of a party requesting for obtaining a resource.

Step 3912. Send the resource obtaining request to a server, so that the server allocates a resource to the resource obtaining party identifier according to the resource information.

Specifically, the second terminal sends the resource obtaining request to the server, and the server obtains the resource identifier and the resource obtaining party identifier according to the resource obtaining request, so as to allocate, to the resource obtaining party identifier, the resource corresponding to the resource identifier. After receiving the resource obtaining request, the server determines whether there is a remaining share in the resource corresponding to the resource identifier, and if there is the remaining share, allocates, to the resource obtaining party identifier, a resource from the remaining resource, and decreases a corresponding share, and feeds back a resource obtaining result indicating that the resource is successfully obtained to the second terminal; or if there is no remaining share, directly feeds back a resource obtaining result indicating that the resource is not successfully obtained to the second terminal.

When the server allocates a resource, if the resource is a resource that is to be allocated as per a value, such as a virtual red packet or a value of a prepaid card, when the server allocates a resource to the resource obtaining party identifier, the server may select a value from a preset value range randomly or according to a preset fixed value, and transfer the value into a value account corresponding to the resource obtaining party identifier. The value account includes a cash account or a voucher account, and the value account may be set on a bank server or a third-party payment server. If the resource is a resource that can be obtained after registration, such as a physical object, when the server allocates the resource to the resource obtaining party identifier, the server may record a correspondence between the resource and the resource obtaining party identifier to represent a ownership of a corresponding user on the resource, so that the resource is subsequently provisioned in other forms.

According to the resource obtaining method, after the resource sharing message is received, the resource sharing message template corresponding to the resource sharing message is displayed. The resource sharing message template matches the theme activity time period. Semantics that match the theme activity time period and that are sent by a resource sharing party are obtained while a resource is obtained by using the resource sharing message, so that more amount of useful information is conveyed.

In an embodiment, step 3904 includes: determining whether locally there is a resource sharing message image corresponding to the resource sharing message; and obtaining the local corresponding resource sharing message image if locally there is the resource sharing message image corresponding to the resource sharing message, where step 3906 includes: displaying the local corresponding resource sharing message image; or displaying a local default resource sharing message image and pulling, from the server, the resource sharing message image corresponding to the resource sharing message if locally there is no resource sharing message image corresponding to the resource sharing message, where step 3906 includes: updating the displayed default resource sharing message image to the pulled resource sharing message image.

Specifically, in this embodiment, the second terminal first determines whether locally there is the resource sharing message image corresponding to the resource sharing message, and directly displays the corresponding resource sharing message image if locally there is the resource sharing message image corresponding to the resource sharing message. If there is no resource sharing message image corresponding to the resource sharing message, to ensure that the user can immediately identify that the message is the resource sharing message image, the user first displays the local default resource sharing message image and then pulls the corresponding resource sharing message image from the server, and performs updating after the corresponding resource sharing message image is pulled.

According to this embodiment, display efficiency of the resource sharing message image can be ensured, and the resource sharing message is displayed after being received, to trigger the resource obtaining request, so that resource obtaining efficiency is improved while efficiency of displaying the resource sharing message image is improved.

Figure 40:
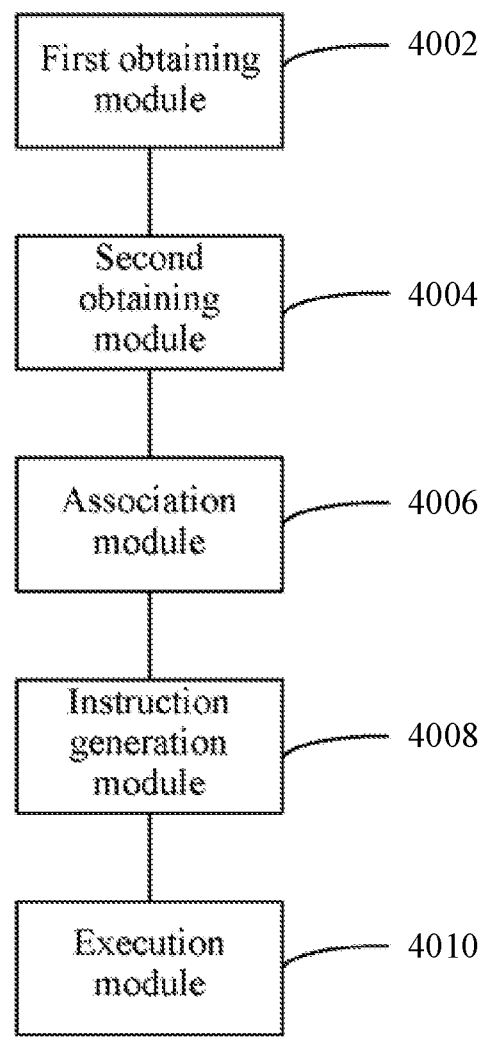
FIG. 40 is a structural block diagram of a resource sharing apparatus according to some embodiments of the present disclosure.

FIG. 40 is a structural block diagram of a resource sharing apparatus according to an embodiment. As shown in FIG. 40, a resource sharing apparatus includes a first obtaining module 4002, a second obtaining module 4004, an association module 4006, an instruction generation module 4008, and an execution module 4010.

The first obtaining module 4002 is configured to obtain configured user identifier.

Specifically, the user identifier may include a resource and an identifier of a user, and may further include information content shared by a resource sharing initiator, a time and a validity period of resource sharing, and the like. The resource may be money, an electronic voucher, a bonus point, game currency, a physical object coin certificate, and the like. The identifier of the user is an identifier that uniquely identifies a user identity, and may be an instant messaging account, a mobile phone number, a social networking application account of the resource sharing initiator.

The second obtaining module 4004 is configured to obtain multimedia data.

In this embodiment, the second obtaining module 4004 is further configured to obtain, according to the resource sharing request, real-time recorded multimedia data or multimedia data selected locally or from a server.

In this embodiment, the multimedia data may be one or two of audio data and video data.

The audio data may be a voice recorded by the resource sharing initiator, music selected by the resource sharing initiator, or audio data downloaded from a network by the resource sharing initiator. The audio data downloaded from the network may be audio data of different voices such as a female voice, a male voice, a child's voice, or a cartoon character's voice.

The video data may be a personalized video recorded by the resource sharing initiator, a video made by the resource sharing initiator, or a video downloaded from a network by the resource sharing initiator. A role in the video may use a cartoon character, a game role, a star character, or the user himself A pre-determined time may be set in recorded voice or video. This effectively limits the size of the voice or the video data and can limit the size of occupied space.

The association module 4006 is configured to: obtain a resource sharing request, and associate the user identifier with the multimedia data according to the resource sharing request.

The instruction generation module 4008 is configured to generate a resource sharing instruction according to an association relationship between the user identifier and the multimedia data.

The execution module 4010 is configured to execute the resource sharing instruction.

The resource sharing apparatus obtains the multimedia data and the configured user identifier, associates the user identifier with the multimedia data according to the resource sharing request, generate the resource sharing instruction according to the association relationship between the user identifier and the multimedia data, and executes the resource sharing instruction, so that the multimedia data can be carried during resource sharing, and types of information carried during resource sharing are expanded.

Further, the resource sharing apparatus further include a generation module and a sending module. The generation module is configured to generate a resource message including the user identifier and the multimedia data; and the sending module is configured to send the resource message including the multimedia data.

In addition, the server may generate, according to the user identifier and the multimedia data, the resource message including the user identifier and the multimedia data.

The second obtaining module 4004 is further configured to: obtain an identifier of a user and a real-time recorded multimedia file, upload the identifier of the user and the multimedia file to a server, and obtain a multimedia identifier allocated by the server to the multimedia file.

In this embodiment, the server allocates the multimedia identifier to the multimedia data, and establishes an association relationship between the multimedia identifier and the identifier of the user.

When the multimedia identifier allocated by the server to the multimedia data is obtained, a resource sharing instruction is generated according to the association relationship between the user identifier and the multimedia identifier, and after the resource sharing instruction is executed, the user identifier and the multimedia identifier are uploaded to the server. The server finds the corresponding multimedia file according to the multimedia identifier, and generates, according to the user identifier and the multimedia file, the resource message including the user identifier and the multimedia data.

Figure 41:
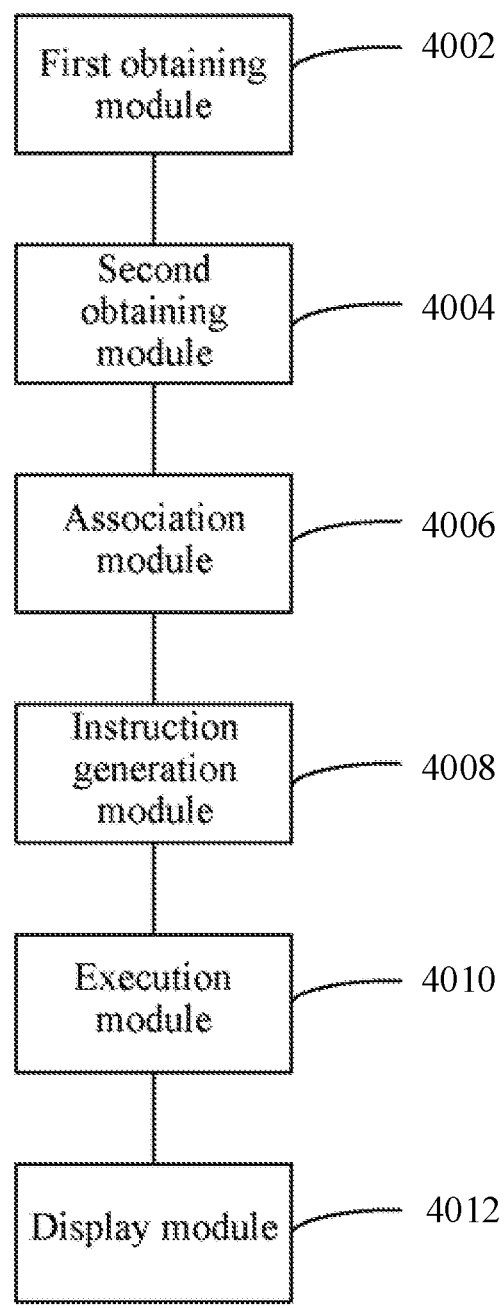
FIG. 41 is a structural block diagram of a resource sharing apparatus according to another embodiment.

FIG. 41 is a structural block diagram of a resource sharing apparatus according to another embodiment. As shown in FIG. 41, in addition to a first obtaining module 4002, a second obtaining module 4004, an association module 4006, an instruction generation module 4008, and an execution module 4010, a resource sharing apparatus further includes a display module 4012.

The display module 4012 is configured to: display a resource message generated after executing a resource sharing instruction, provide a transparent layer on a resource message body of the resource message, and display multimedia data at the transparent layer.

Further, the display module 4012 is further configured to: after displaying the multimedia data at the transparent layer, display, at the transparent layer, a multimedia control configured to control playback of the multimedia data.

In an embodiment, the first obtaining module 4002 is further configured to: obtain an identifier of a user that initiates a resource sharing request, determine whether the identifier of the user has permission to share a personalized resource, and if the identifier of the user has the permission, obtain the multimedia data according to the resource sharing request, or if the identifier of the user does not have the permission, prompt the user to enable the permission to share the personalized resource.

Figure 42:
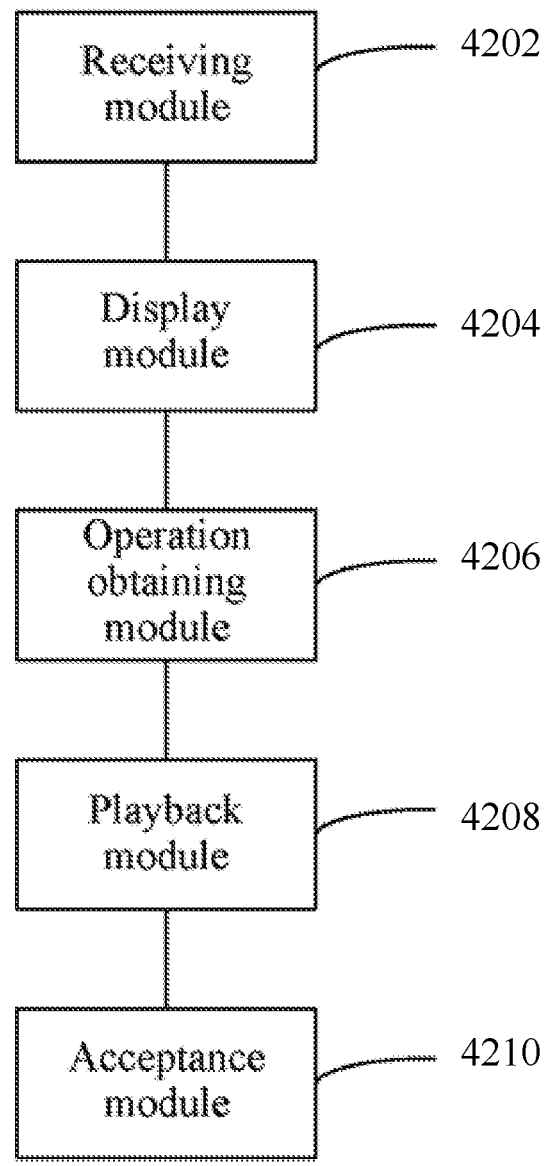
FIG. 42 is a structural block diagram of a resource sharing apparatus according to another embodiment.

FIG. 42 is a structural block diagram of a resource sharing apparatus according to another embodiment. As shown in FIG. 42, a resource sharing apparatus includes a receiving module 4202, a display module 4204, an operation obtaining module 4206, a playback module 4208, and an acceptance module 4210.

The receiving module 4202 is configured to receive a resource message.

The display module 4204 is configured to display the resource message.

The operation obtaining module 4206 is configured to obtain a trigger operation on the resource message.

The playback module 4208 is configured to play multimedia data in the resource message according to the trigger operation.

The acceptance module 4210 is configured to receive a resource in the resource message.

The resource sharing apparatus performs the trigger operation on the received resource message, plays the multimedia data in the resource message, and receives the resource in the resource message, so that the resource message carries the multimedia data, and types of information carried during resource sharing are expanded.

Figure 43:
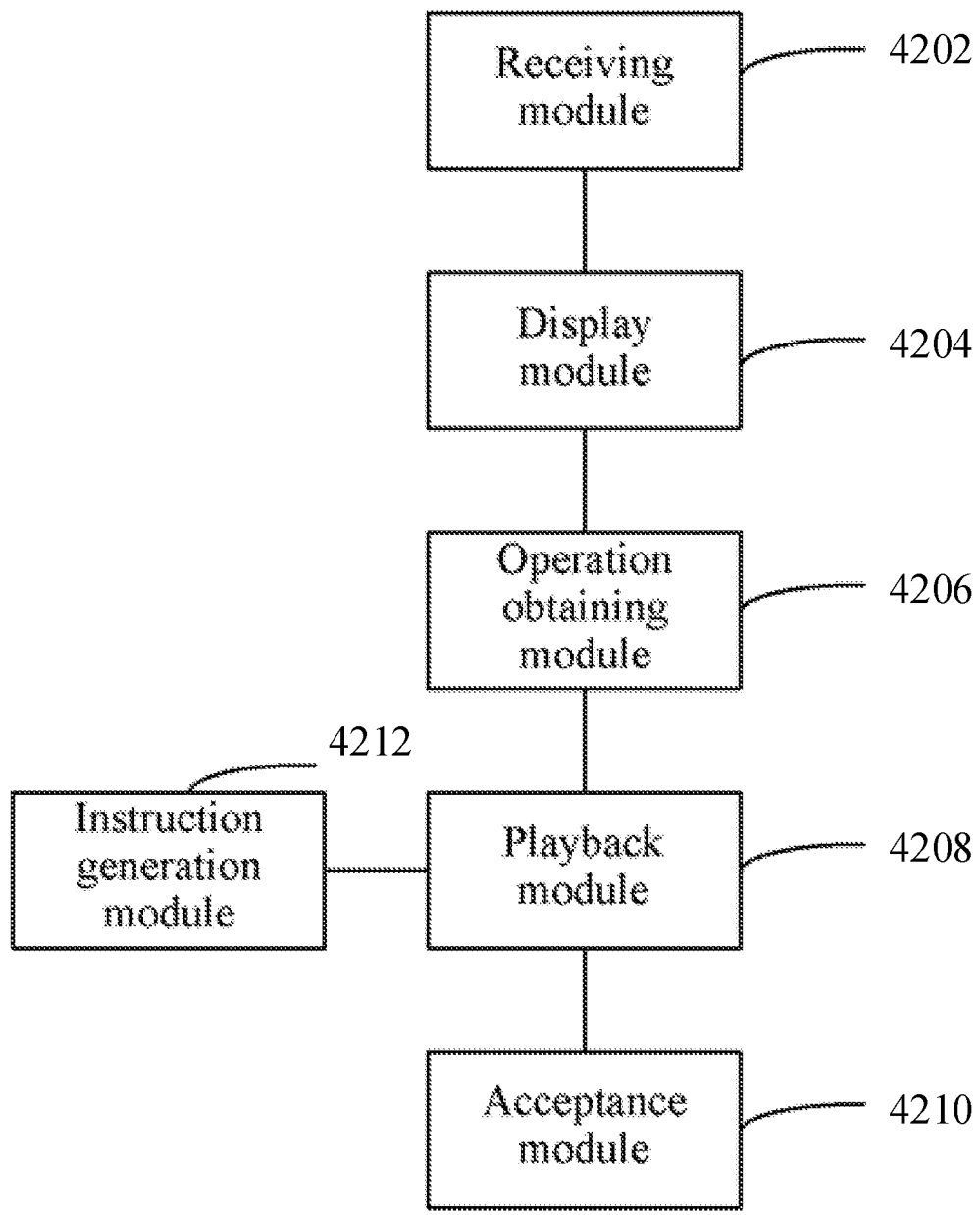
FIG. 43 is a structural block diagram of a resource sharing apparatus according to another embodiment.

FIG. 43 is a structural block diagram of a resource sharing apparatus according to another embodiment. As shown in FIG. 43, a resource sharing apparatus includes a receiving module 4202, a display module 4204, an operation obtaining module 4206, a playback module 4208, and an acceptance module 4210, and further includes an instruction generation module 4212.

A transparent layer is provided on a resource message body of a resource message, and multimedia data and a multimedia control that is configured to control playback of the multimedia data are displayed at the transparent layer.

The instruction generation module 4212 is configured to obtain a trigger operation on the multimedia control to generate a corresponding control instruction.

The playback module 4208 is further configured to play the multimedia data according to the control instruction.

The receiving module 4202 is further configured to receive the resource message on a chat interface.

The playback module 4208 is further configured to automatically play the multimedia data in the resource message.

A person of ordinary skill in the art may understand that all or some of the processes of the methods in the foregoing embodiments may be implemented by a computer program instructing relevant hardware. The program may be stored in a non-transitory computer readable storage medium. When the program is executed, processes of the foregoing method embodiments may be performed. The storage medium may be a magnetic disk, an optical disc, a read-only memory (ROM), or the like.

The foregoing embodiments only describe several implementation manners of the present disclosure, and their description is specific and detailed, but cannot therefore be understood as a limitation to the patent scope of the present disclosure. It should be noted that a person of ordinary skill in the art may further make some variations and improvements without departing from the concept of the present disclosure, and the variations and improvements belong to the protection scope of the present disclosure. Therefore, the protection scope of the present disclosure should be subject to the protection scope of the appended claims.

What is claimed is:

1. A gift sharing method performed at a mobile terminal having one or more processors and memory storing a plurality of programs to be executed by the one or more processors, the method comprising, comprising:

configuring a to-be-shared gift to obtain data for a second user of a social networking application to receive a gift from a first user of the social networking application, wherein the first user and the second user are members of a chat session hosted by the social networking application, the second user being a friend of the first user on the social networking application prior to receiving the gift from the first user;

obtaining a user identifier of the first user, wherein the first user is currently logged-in to the social networking application at the mobile terminal;

obtaining a gift sharing message image template, a user-defined visible element, and configuration information of the visible element that are associated with the user identifier of the first user, wherein the visible element comprises a combination of one or more of a character, a picture and an animated file, and wherein the configuration information of the visible element includes a relationship between the user-defined visible element and the gift sharing message image template by:

querying a server for the gift sharing message image template, the user-defined visible element, and the configuration information of the visible element that are associated with the user identifier; and drawing a gift sharing message image according to the gift sharing message image template, the user-defined visible element, and the configuration information, if the gift sharing message image template, the user-defined visible element, and the configuration information of the visible element that are associated with the user identifier are found at the server;

in response to receiving a gift sharing instruction from the first user, displaying the gift sharing message image on a social network propagation page of the social networking application; and transferring, by using a social network, a gift sharing message corresponding to the gift sharing message image to the second user at a second mobile terminal for displaying the gift sharing message using an instant messaging session window corresponding to the chat session at the second mobile terminal, the gift sharing message comprising the data for the second user of the social networking application to receive the gift, wherein the gift sharing message image template constrains an overall shape and size of the gift sharing message image, and controls a shape, a size, and/or a location of an editing area used to accommodate the user-defined visible element.

2. The method according to claim 1, further comprising:
selecting the gift sharing message image template from candidate gift sharing message image templates;
obtaining the user-defined visible element;
obtaining the configuration information corresponding to the user-defined visible element; and
associating the selected gift sharing message image template, the user-defined visible element, and the obtained configuration information with the user identifier.

3. The method according to claim 2, wherein before the obtaining the user-defined visible element, the method further comprises:
obtaining a constraint condition corresponding to the selected gift sharing message image template; and
the obtaining the user-defined visible element comprises:
obtaining the user-defined visible element under the constraint condition.

4. The method according to claim 1, further comprising:
obtaining an operation instruction for the displayed gift sharing message image;
generating, according to the operation instruction, a gift obtaining request that comprises a gift identifier and a gift obtaining party identifier;
sending the gift obtaining request to a server, so that the server allocates, to the gift obtaining party identifier, a gift corresponding to the gift identifier;
receiving a gift obtaining result fed back by the server; and
displaying a result displaying page having a custom background image that matches the visible element, and displaying the gift obtaining result on the result displaying page.

5. The method according to claim 1, wherein the querying a server for the gift sharing message image template, the user-defined visible element, and the configuration information of the visible element that are associated with the user identifier comprises:
determining whether locally there stores drawn data associated with the user identifier, wherein the drawn data comprises the gift sharing message image template, the user-defined visible element, and the configuration information of the visible element that are associated with the user identifier;
in accordance with a determination that locally there stores the drawn data, querying the server whether a change occurs in the drawn data corresponding to the user identifier, in a time period from a time when the drawn data is obtained last time to a current time; and
in accordance with a determination that no change occurs, directly locally obtaining the drawn data corresponding to the user identifier; and
in accordance with a determination of a change occurs or if locally there does not store the drawn data, querying the server for the drawn data corresponding to the user identifier.

6. The method according to claim 1, wherein the gift sharing message is used to trigger an action of obtaining a gift; the gift comprises at least one of a virtual object and a physical object; and the visible element comprises at least one of a character and an image.

7. A mobile terminal comprising one or more processors, memory coupled to the one or more processors, and a plurality of programs stored in the memory that, when executed by the one or more processors, cause the mobile terminal to perform operations including:
configuring a to-be-shared gift to obtain data for a second user of a social networking application to receive a gift from a first user of the social networking application, wherein the first user and the second user are members of a chat session hosted by the social networking application, the second user being a friend of the first user on the social networking application prior to receiving the gift from the first user;
obtaining a user identifier of the first user, wherein the first user is currently logged-into the social networking application at the mobile terminal;
obtaining a gift sharing message image template, a user-defined visible element, and configuration information of the visible element that are associated with the user identifier of the first user, wherein the visible element comprises a combination of one or more of a character, a picture and an animated file, and wherein the configuration information of the visible element includes a relationship between the user-defined visible element and the gift sharing message image template by:
querying a server for the gift sharing message image template, the user-defined visible element, and the configuration information of the visible element that are associated with the user identifier; and
drawing a gift sharing message image according to the gift sharing message image template, the user-defined visible element, and the configuration information, if the gift sharing message image template, the user-defined visible element, and the configuration information of the visible element that are associated with the user identifier are found at the server;
in response to receiving a gift sharing instruction from the first user, displaying the gift sharing message image on a social network propagation page of the social networking application; and
transferring, by using a social network, a gift sharing message corresponding to the gift sharing message image to the second user at a second mobile terminal for displaying the gift sharing message using an instant messaging session window corresponding to the chat session at the second mobile terminal, the gift sharing message comprising the data for the second user of the social networking application to receive the gift, wherein the gift sharing message image template constrains an overall shape and size of the gift sharing message image, and controls a shape, a size, and/or a location of an editing area used to accommodate the user-defined visible element.

8. The mobile terminal according to claim 7, wherein the operations further comprise:
selecting the gift sharing message image template from candidate gift sharing message image templates;
obtaining the user-defined visible element;
obtaining the configuration information corresponding to the user-defined visible element; and
associating the selected gift sharing message image template, the user-defined visible element, and the obtained configuration information with the user identifier.

9. The mobile terminal according to claim 8, wherein the operations further comprise:
before obtaining the user-defined visible element:
obtaining a constraint condition corresponding to the selected gift sharing message image template; and
obtaining the user-defined visible element under the constraint condition.

10. The mobile terminal according to claim 7, wherein the operations further comprise:
obtaining an operation instruction for the displayed gift sharing message image;
generating, according to the operation instruction, a gift obtaining request that comprises a gift identifier and a gift obtaining party identifier;
sending the gift obtaining request to a server, so that the server allocates, to the gift obtaining party identifier, a gift corresponding to the gift identifier;
receiving a gift obtaining result fed back by the server; and
displaying a result displaying page having a custom background image that matches the visible element, and displaying the gift obtaining result on the result displaying page.

11. The mobile terminal according to claim 7, wherein the querying a server for the gift sharing message image template, the user-defined visible element, and the configuration information of the visible element that are associated with the user identifier comprises:
determining whether locally there stores drawn data associated with the user identifier, wherein the drawn data comprises the gift sharing message image template, the user-defined visible element, and the configuration information of the visible element that are associated with the user identifier;
in accordance with a determination that locally there stores the drawn data, querying the server whether a change occurs in the drawn data corresponding to the user identifier, in a time period from a time when the drawn data is obtained last time to a current time; and
in accordance with a determination that no change occurs, directly locally obtaining the drawn data corresponding to the user identifier; and
in accordance with a determination of a change occurs or if locally there does not store the drawn data, querying the server for the drawn data corresponding to the user identifier.

12. The mobile terminal according to claim 7, wherein the gift sharing message is used to trigger an action of obtaining a gift; the gift comprises at least one of a virtual object and a physical object; and the visible element comprises at least one of a character and an image.

13. A non-transitory computer readable storage medium storing a plurality of programs that, when executed by one or more processors of a mobile terminal, cause the mobile terminal to perform operations including:
configuring a to-be-shared gift to obtain data for a second user of a social networking application to receive a gift from a first user of the social networking application, wherein the first user and the second user are members of a chat session hosted by the social networking application, the second user being a friend of the first user on the social networking application prior to receiving the gift from the first user;
obtaining a user identifier of the first user, wherein the first user is currently logged-in to the social networking application at the mobile terminal;
obtaining a gift sharing message image template, a user-defined visible element, and configuration information of the visible element that are associated with the user identifier of the first user, wherein the visible element comprises a combination of one or more of a character, a picture and an animated file, and wherein the configuration information of the visible element includes a relationship between the user-defined visible element and the gift sharing message image template by:
querying a server for the gift sharing message image template, the user-defined visible element, and the configuration information of the visible element that are associated with the user identifier; and
drawing a gift sharing message image according to the gift sharing message image template, the user-defined visible element, and the configuration information, if the gift sharing message image template, the user-defined visible element, and the configuration information of the visible element that are associated with the user identifier are found at the server;
in response to receiving a gift sharing instruction from the first user, displaying the gift sharing message image on a social network propagation page of the social networking application; and
transferring, by using a social network, a gift sharing message corresponding to the gift sharing message image to the second user at a second mobile terminal for displaying the gift sharing message using an instant messaging session window corresponding to the chat session at the second mobile terminal, the gift sharing message comprising the data for the second user of the social networking application to receive the gift, wherein the gift sharing message image template constrains an overall shape and size of the gift sharing message image, and controls a shape, a size, and/or a location of an editing area used to accommodate the user-defined visible element.

14. The non-transitory computer readable storage medium according to claim 13, wherein the operations further comprise:
selecting the gift sharing message image template from candidate gift sharing message image templates;
obtaining the user-defined visible element;
obtaining the configuration information corresponding to the user-defined visible element; and
associating the selected gift sharing message image template, the user-defined visible element, and the obtained configuration information with the user identifier.

15. The non-transitory computer readable storage medium according to claim 14, wherein the operations further comprise:
before obtaining the user-defined visible element:
obtaining a constraint condition corresponding to the selected gift sharing message image template; and
obtaining the user-defined visible element under the constraint condition.

16. The non-transitory computer readable storage medium according to claim 13, wherein the operations further comprise:
obtaining an operation instruction for the displayed gift sharing message image;
generating, according to the operation instruction, a gift obtaining request that comprises a gift identifier and a gift obtaining party identifier;
sending the gift obtaining request to a server, so that the server allocates, to the gift obtaining party identifier, a gift corresponding to the gift identifier;

receiving a gift obtaining result fed back by the server; and displaying a result displaying page having a custom background image that matches the visible element, and displaying the gift obtaining result on the result displaying page.

17. The non-transitory computer readable storage medium according to claim 13, wherein the gift sharing message is used to trigger an action of obtaining a gift; the gift comprises at least one of a virtual object and a physical object; and the visible element comprises at least one of a character and an image.

\* \* \* \* \*